US012764412B2

(12) United States Patent
Xu et al.

(10) Patent No.: US 12,764,412 B2
(45) Date of Patent: Oct. 13, 2026

(54) SYSTEMS AND METHODS FOR PROVIDING ARTISTIC ASSISTANCE ON IMAGE CAPTURING

(71) Applicant: Adeia Imaging LLC, San Jose, CA (US)

(72) Inventors: Ning Xu, Irvine, CA (US); Serhad Doken, Bryn Mawr, PA (US)

(73) Assignee: Adeia Imaging LLC, San Jose, CA (US)

( * ) Notice: Subject to any disclaimer, the term of this patent is extended or adjusted under 35 U.S.C. 154(b) by 158 days.

(21) Appl. No.: 18/521,620

(22) Filed: Nov. 28, 2023

(65) Prior Publication Data

US 2025/0175694 A1 May 29, 2025

(51) Int. Cl.

| | |
|---|---|
| ***H04N 23/60*** | (2023.01) |
| ***G06T 5/50*** | (2006.01) |
| ***G06T 5/77*** | (2024.01) |
| ***G06T 7/00*** | (2017.01) |

(52) U.S. Cl.

CPC ............... *H04N 23/64* (2023.01); *G06T 5/50* (2013.01); *G06T 5/77* (2024.01); *G06T 7/0002* (2013.01); *G06T 2200/24* (2013.01); *G06T 2207/20081* (2013.01); *G06T 2207/30168* (2013.01)

(58) Field of Classification Search

None

See application file for complete search history.

(56) References Cited

U.S. PATENT DOCUMENTS

| | | | | |
|---|---|---|---|---|
| 9,723,200 | B2 | 8/2017 | Kanumuri et al. | |
| 2016/0187199 | A1* | 6/2016 | Brunk | G01J 3/0208 348/89 |
| 2018/0330198 | A1* | 11/2018 | Harary | G06F 16/51 |
| 2020/0184278 | A1* | 6/2020 | Zadeh | G06N 3/044 |
| 2024/0135561 | A1* | 4/2024 | Ding | G06V 10/26 |
| 2024/0135613 | A1* | 4/2024 | Ding | G06V 10/25 |

OTHER PUBLICATIONS

Broz, M., "How many photos are taken every day?", Photutorial, available online at: <https://photutorial.com/photos-statistics/>, Sep. 12, 2024, 7 pages.

(Continued)

*Primary Examiner* — James M Hannett

(74) *Attorney, Agent, or Firm* — HG Law LLP

(57) ABSTRACT

Systems and methods for enhancing a live scene to be captured by a camera of a user device based on one or more best matched reference images that include similar subject matter and attributes of the live scene are disclosed. A preview of a live scene is displayed on the user device. Attributes of the live scene are identified. The live scene is segmented separately into a foreground and a background. Vector representations of the attributes of the segmented live scene are calculated and user device parameters are obtained, and both are used to identify reference images that include the attributes of the live scene. The identified reference images are displayed on the user device and a selection is made. The user device parameters are configured based on the selection made to capture the live scene to obtain similar effects of the selected reference image.

20 Claims, 14 Drawing Sheets

100

(56) References Cited

OTHER PUBLICATIONS

Cao, B., et al., “Unifying Deep Local and Global Features for Image Search”, Lecture Notes in Computer Science, vol. 12365, 2020, 25 pages.
Liu, H., et al., “PD-GAN: Probabilistic Diverse GAN for Image Inpainting”, Proceedings of the IEEE/CVF Conference on Computer Vision and Pattern Recognition, 2021, pp. 9371-9381.
Lu, X., et al., “Rating Image Aesthetics Using Deep Learning”, IEEE Transactions on Multimedia, vol. 17, No. 11, Nov. 2015, pp. 2021-2034 (23 Pages).
Sato, K., et al., “Find anything blazingly fast with Google’s vector search technology”, available online at: <https://cloud.google.com/blog/topics/developers-practitioners/find-anything-blazingly-fast-googles-vector-search-technology>, Dec. 14, 2021, 20 pages.
Shah, P., et al., “PeR-ViS: Person Retrieval in Video Surveillance Using Semantic Description”, Proceedings of the IEEE/CVF Winter Conference on Applications of Computer Vision (WACV) Workshops, 2021, pp. 41-50.
Shutterstock, “One library, millions of ways to tell your story”, available online at: <https://www.shutterstock.com>, retrieved on Nov. 28, 2024, 1 page.
Wang, P., “Understanding Convolution for Semantic Segmentation”, 2018 IEEE Winter Conference on Applications of Computer Vision (WACV), 2018, 10 pages.
Wang, W., et al., “A Deep Network Solution for Attention and Aesthetics Aware Photo Cropping”, IEEE Transactions on Pattern Analysis and Machine Intelligence , vol. 41, No. 7, Jul. 1, 2019, 1531-1544.
Wiggers, “ImagenAI, which uses AI to personalize photo editing styles, lands $30M,” TechCrunch, Dec. 19, 2022 {https://techcrunch.com/2022/12/19/imagenai-which-uses-ai-to-personalize-photo-editing-styles-lands-30m/) (9 pages).

* cited by examiner

100

SYSTEMS AND METHODS FOR PROVIDING ARTISTIC ASSISTANCE ON IMAGE CAPTURING

FIELD OF DISCLOSURE

Embodiments of the present disclosure relate to using reference images that include similar subject matter and/or attributes of an image to be captured (or a captured image) for enhancing the image to be captured by a user device (such as a smart phone) and automatically configuring the user device to capture the image with an effect similar to that of the reference image.

BACKGROUND

Several years ago, taking a photo used to require cumbersome steps that included loading a film roll in a manual camera and then adjusting several dials on the camera, such as focusing the zoom lens, to take a decent picture. Once the picture was taken, it was unknown how it actually turned out and people had to wait until the film was developed to see the results.

Gone are those old days with the camera technology embedded in a smart phone, for instance. Now with a click, a picture can be taken with a smart phone camera and displayed immediately. Manufacturers such as Google™, Samsung™, Nokia™, and Apple™ constantly one-up each other with the latest and greatest in smart phone camera technology. In their current state, some smart phones have multiple camera lenses as opposed to the one camera lens that was all that existed in phones just a few years ago.

As the phone technology improves, along with the ease of taking a photo, millions of photographs are taken on a daily basis by users using their smart phones. Certain statistics show that the numbers are staggering, e.g., by some estimates over a trillion photographs are taken by smart phones in a year.

Although taking a photograph has become easier and the access to useful technology has become ubiquitous, the process still has several drawbacks. For example, the same picture taken by two different users using the same model of a smart phone can have drastically different results, where one looks much more polished and professional compared to the other.

Many photo takers still do not understand how to take a good photo with their smart phone. Besides following some general guidelines, such as cleaning the lens, holding the camera steady, holding the camera at a certain angle, and tapping your subject to lock focus, the average user still struggles to use features of the phone or lacks the know-how to take a good picture. The struggles are compounded as the newer smart phones provide more sophisticated feature parameters that can be set, such as to improve image or aesthetic quality based on the specific conditions.

Taking a good photo may also be based on the person's vision and their artistic choices. For example, how to frame the picture, how to have a good pose that goes with the environment and mood, and when and where to introduce some special effects, like using a longer exposure time for capturing a waterfall, or underexposing a subject to get its silhouette, are some of such artistic choices. In the absence of artistic ability, numerous photos captured by an average individual are not of the quality that would compare to a seasoned or professional photographer, or a more technically savvy user, taking the same photo.

As such, there is a need for methods and systems that allows better photo capture and enhancement techniques.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
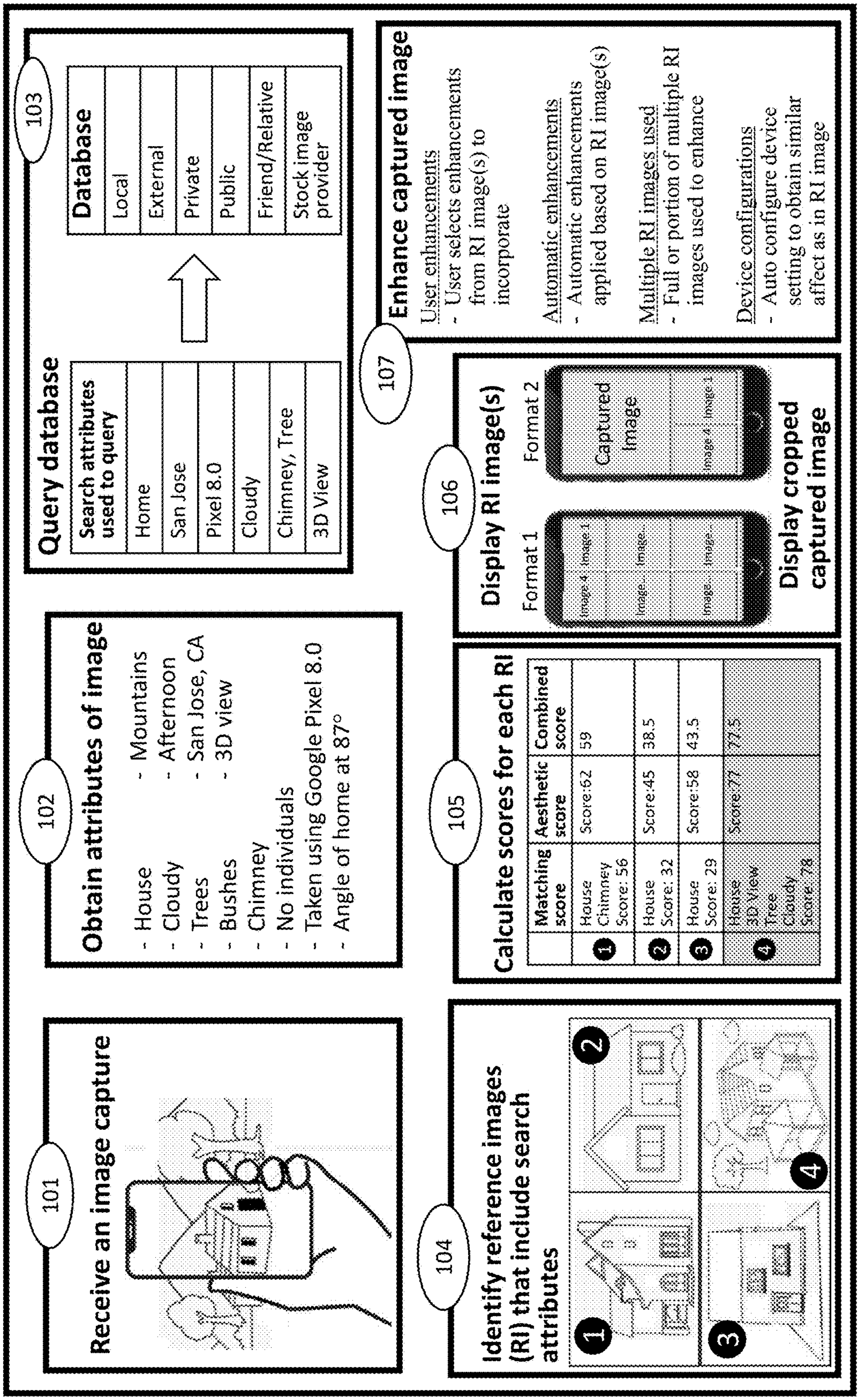
FIG. 1 is a block diagram of an example of a process for enhancing a captured image based on one or more reference images, in accordance with some embodiments of the disclosure.

In accordance with some embodiments disclosed herein, some of the above-mentioned limitations are overcome displaying a preview of a live scene (such as, displaying an image in the viewfinder), analyzing the scene to identify attributes, calculating vector representations of one or more of the attributes, determining one or more device parameters, using vector representations and one or more device parameters to identify reference images, displaying the reference images, and receiving user input to then capture an image. Some of the above-mentioned limitations are also overcome by enhancing an already captured image that is received by the smart phone by displaying the received image (such as in a photo library or viewfinder), analyzing the captured image to identify attributes, calculating vector representations of one or more of the attributes of the captured image, determining one or more device parameters, using vector representations and one or more device parameters to identify reference images, displaying the reference images, and receiving user input to enhanced the captured image using the reference images.

In some embodiments, the systems and methods described herein are used to receive a captured image that is taken by a camera associated with an electronic device, such as a smart phone camera. Attributes of the captured image are then obtained. In some embodiments, a deep learning model may be used to analyze the images and obtain specific attributes of objects, scenes, people, etc., that are depicted in the images. These attributes may include the location, time, and place associated with the captured image. The attributes may also include subject matter details, such as identification of objects and people in the image. Further, the attributes may also provide details relating to the composition of the image, such as framing, lighting, contrast, brightness, etc. Examples attributes further include details relating to the device used to capture the image. Combinations of such attributes are used to distinctly identify the image and its characteristics such that reference images that are of professional quality and that include attributes similar to those of the captured image are identified and can be used to enhance the image capture process.

A search query is generated based on one or more of the obtained attributes. The search query may include only one attribute, several attributes, all attributes, or certain selected key attributes of the captured image. The search query may be transmitted to a server to search for related reference images. Instead of transmitting a search query to the server, the captured image may be transmitted to the server such that the server can analyze the captured image and determine which reference images include attributes similar to those of the captured image. In other embodiments, instead of transmitting the captured image to the server, a deep learning model is used to generate a vector representation of the captured image, and the vector representation is transmitted to the server.

The server obtains reference images from a plurality of sources. They include images from other servers, individuals, companies, photographers, etc. These also include reference images on the user device. Although a server is described, the user device may also obtain and store reference images in a storage associated with the user device. The reference images are curated for their professional quality, and only those reference images that meet a predetermined quality standard are kept while other obtained reference images are discarded. The measure of quality of a reference image is determined based on its aesthetic score. The aesthetic score is calculated based on a plurality of factors. These factors are based on well-established techniques and principles that are used by professional photographers in taking a professional quality photograph. For example, if the reference image has good framing, pose, brightness, contrast, and symmetry, which are well-accepted composition factors found typically in a professionally taken image, then the reference image receives an aesthetic score based on the degree to which each such factor is deployed in the reference image. As such, the higher the degree of adherence to photographic principles, creativity, and look, the higher the aesthetic score of the reference image.

In some embodiments, once the server receives the search query based on attributes of the captured image, it determines whether one or more reference images stored in a database associated with the server include the one or more attributes of the search query. If a determination is made that a plurality of reference images includes the one or more attributes of the captured image, then the server identifies those reference images for a visual matching score calculation. This calculation determines the degree to which the attributes of the reference image match the attributes queried, i.e., attributes of the captured image. In other embodiments where the user device may obtain and store reference images, upon receiving a search query, the user device may determine whether one or more reference images stored in a storage associated with the user device includes the one or more attributes of the search query.

The server also computes a combined score for each reference image. In other embodiments, the user device may also compute the combined score for each reference image. In one embodiment, the combined score is a combination of both the aesthetic score as well as the visual matching score. In another embodiment, the combined score may be based on a percentage of foreground of the image.

The server then selects a subset of reference images that have a combined score that exceeds the predetermined combined score threshold and displays them on the user device. The server may use several formats in displaying the reference images on the user device. For example, the reference images may be presented at a bottom of a user interface in a tile format while the captured image may be presented in a larger display above the tiled reference images. Although a server, in some embodiments, may be used to perform the above-mentioned process, in other embodiments, a user device may also perform the same processes.

Once the reference images are displayed on the user's electronic interface, the user may select any one or more of the reference images for their captured image to emulate. In other words, the user may re-capture or enhance the captured image to have the same or similar effect as the professionally taken reference image. In some embodiments, the system may automatically enhance the captured image based on its selected reference image. The system may also automatically reconfigure the user device based on the selected reference image such that the reconfigured settings allow the user to recapture an image such that the recaptured image would have an effect similar to that of the selected reference image.

Turning to the figures, FIG. 1 is a block diagram of an example of a process 100 for enhancing a captured image based on one or more reference images, in accordance with some embodiments of the disclosure. The process 100 may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3 as one or more instructions or routines that may be executed by a corresponding device or system to implement the process 100.

Figure 2:
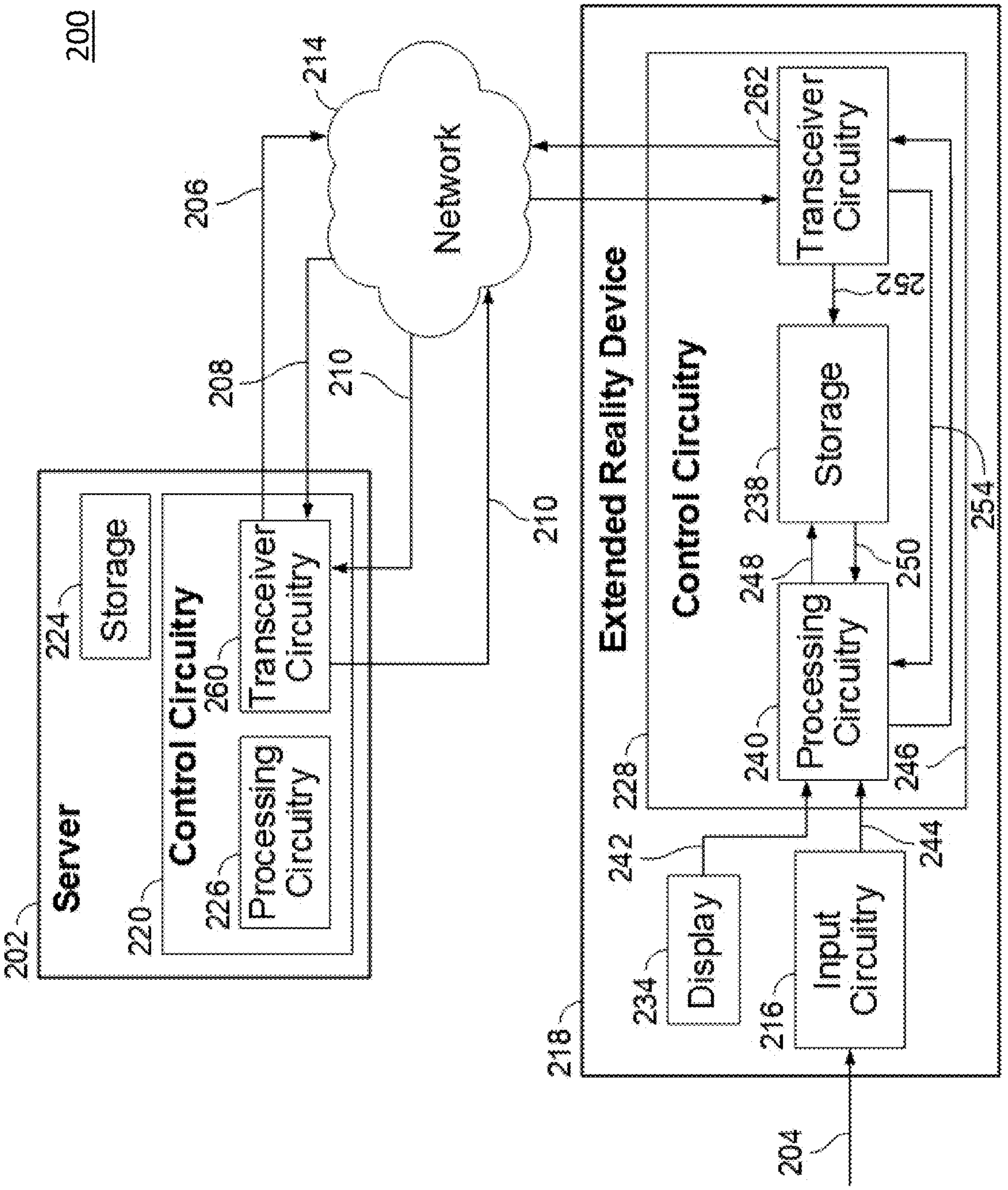
FIG. 2 is a block diagram of an example system for enhancing a captured image based on one or more reference images, in accordance with some embodiments of the disclosure.

In some embodiments, at block 101, the control or processing circuitry, such as the control circuitry 220 and/or 228 or processing circuitry 226 and/or 240 shown in FIG. 2, may receive an image captured by an electronic device.

The electronic device used to capture the image may be a smart phone, smart watch, laptop, tablet, or any other device that includes a camera, or is associated with a camera, and is capable of capturing an image or has capability to receive an input of an image. Some additional embodiments of electronic devices used to capture the image may be an autonomous car camera array, a security camera, a doorbell camera, a drone, or cameras associated with smart glasses, augmented reality devices, or headsets.

In some embodiments, the image captured may be a photograph or a portrait. The image may also be a video. The image may also be any other type of image. The image may be of scenery, such as a beach, mountain, or playground, that may not include any individuals or animals. The image may be of scenery that includes individuals and/or animals, but such individuals or animals may be far away or not the focus of the image. The image may also be focused on individuals and/or animals. The image may be of scenery that includes individuals and/or animals in its foreground. The image may also be focused on a specific object or a product, such as a vase, painting, or a Pepsi™ soda can.

The process 100 may be triggered in one of several ways. In some embodiments, process 100 is triggered when a camera is activated on an electronic device. For example, if a user selects a camera application downloaded on their smart phone, activation of such camera may trigger process 100.

In another embodiment, process 100 is triggered when an image is displayed in a viewfinder. The viewfinder may be part of a camera associated with a mobile device or may be part of augmented reality smart glasses through which an image can be seen. The viewfinder may also be part of an autonomous vehicle that shows a car or road ahead or behind, and is displayed on a display associated with the autonomous vehicle, such as the display used for navigation.

In another embodiment, process 100 may be triggered once an image is captured by the electronic device. For example, once a user clicks a capture option, such as a button on the smart phone to take a picture, then process 100 may be triggered. In some embodiments, the image capture may be part of a continuous operation that is performed by an IoT device that takes pictures continuously or periodically and stores them in a memory. In some embodiments, the image may be displayed on the user device, and in other embodiments the image may be stored at a storage location, such as an image stored in memory to create 3D maps.

In some embodiments, once an image is received, such as through a text or e-mail, social media messages or social media feed, the process 100 may be triggered. In other embodiments, a user may select their photo library on their electronic device, such as a photo library that can be accessed through a smart phone or tablet. Upon selection of the photo library, process 100 may be initiated to enhance all those images in the photo library that can benefit from image enhancements.

In yet other embodiments, process 100 may be triggered when a user attaches an image to an outgoing message, such as an e-mail, a text, or a WhatsApp™ message. An example of the enhancing an image when the image is used as part of an outgoing message is described in detail below in connection with FIG. 14.

Figure 4:
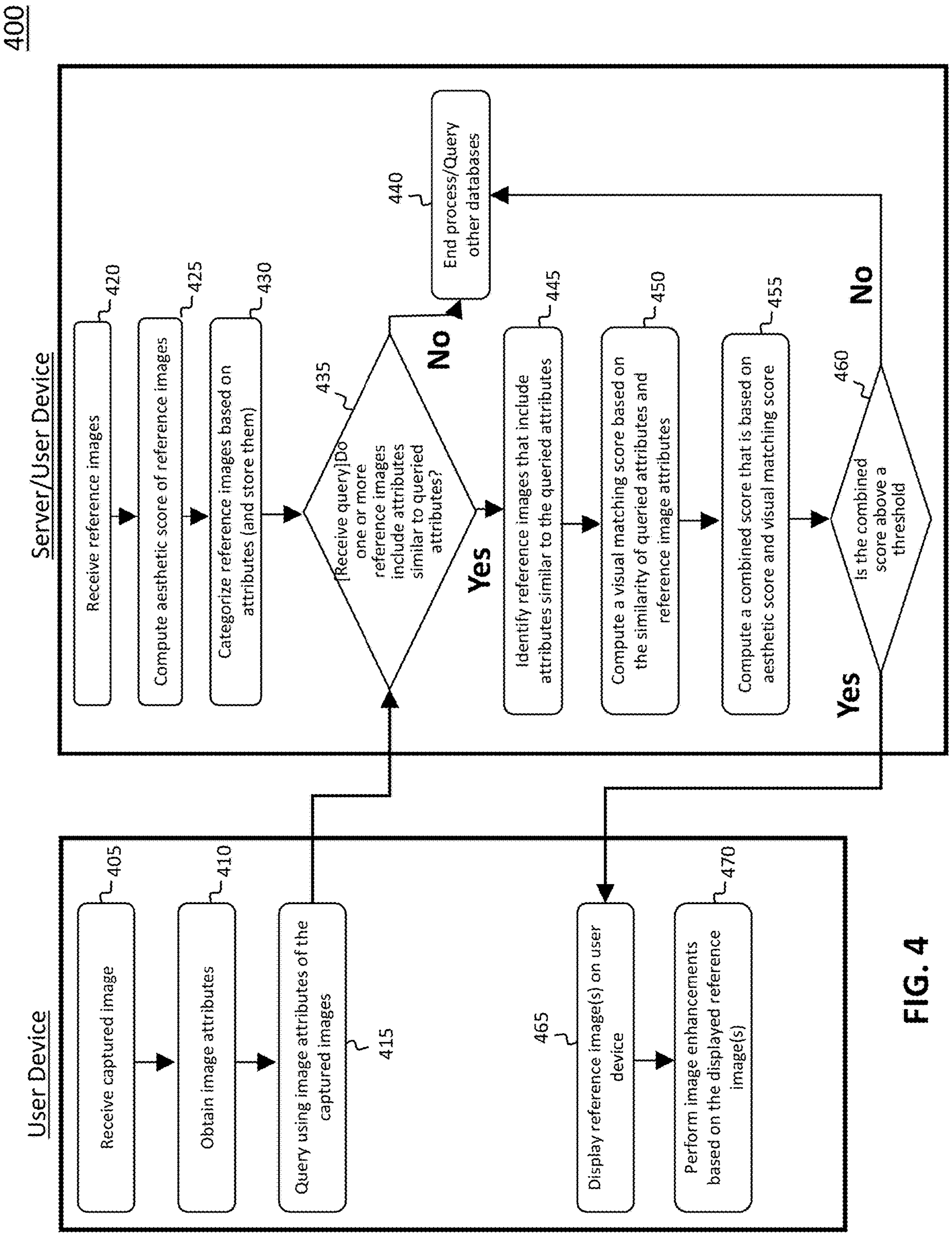
FIG. 4 is a flowchart of an example of a process for enhancing a captured image based on one or more reference images, in accordance with some embodiments of the disclosure.
Figure 5:
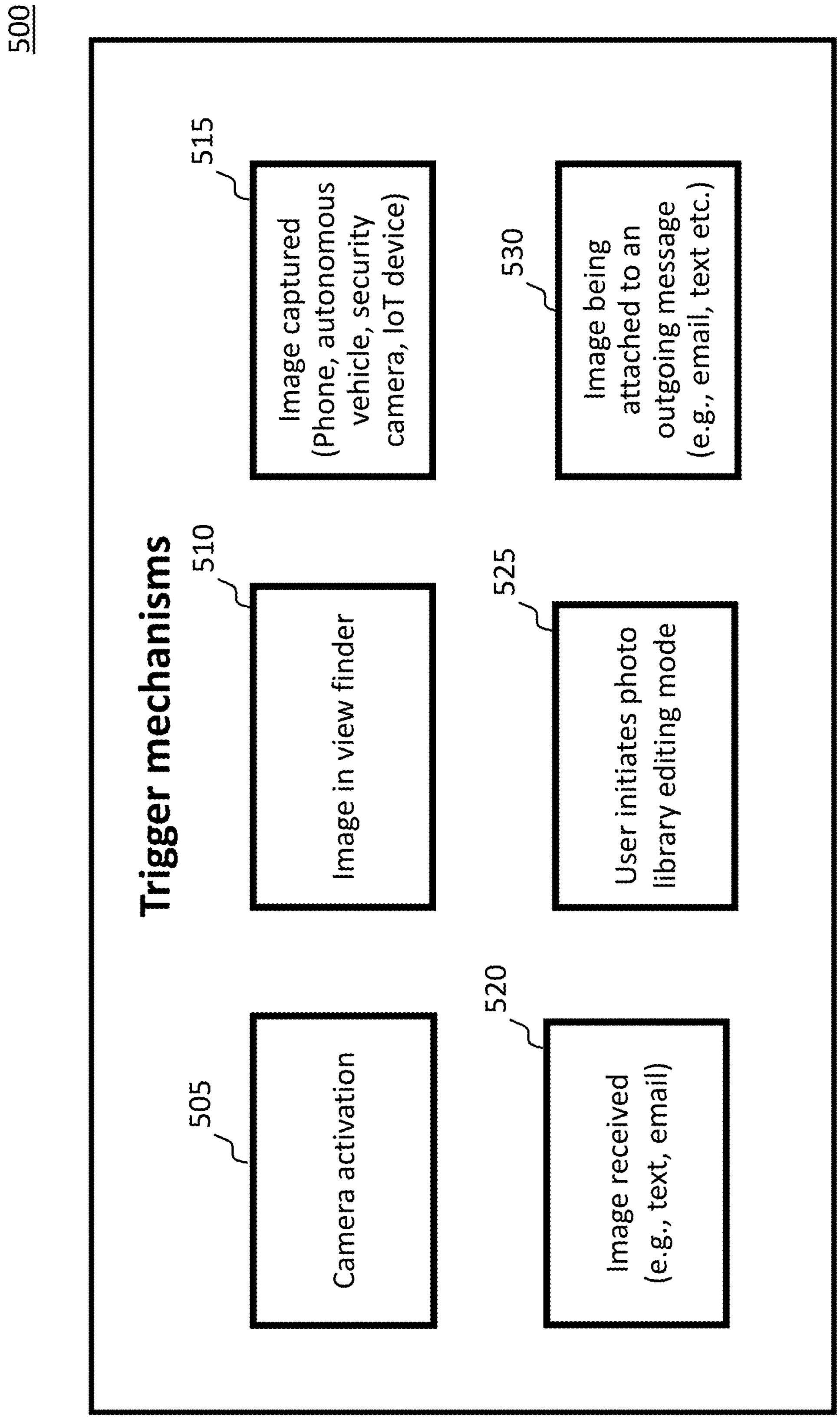
FIG. 5 is a block diagram of trigger mechanisms that may initiate the captured image enhancement process, in accordance with some embodiments of the disclosure.

In addition to the trigger mechanisms described above, other examples of trigger mechanisms that trigger process 100 (or process 400 of FIG. 4) are described in FIG. 5.

At block 102, once an image is captured, attributes associated with the image are obtained. In some embodiments, the user may have the image in their viewfinder or on a display on their mobile device and the image has not been captured yet, e.g., the user has not pressed a button to take the photo of a scene. In such circumstances, when the image is in the viewfinder and not yet captured, the control circuitry 220 and/or 228 may obtain the attributes of the image displayed in the viewfinder.

Some examples of attributes obtained include the attributes of the background of the image. Such attributes may describe the background or the setting of the image. In other words, the background may be a beach, city view, view of a park, an office, a store, a business, and may be either indoors or outdoors. The attributes may also include the lighting conditions, such as sunny, cloudy, partly cloudy, bright, dark, etc.

The attributes may also include details of the subject, such as lamp, tree, bushes, flowers, house, portions of the house (such as chimney, living room, bathroom), remodeled house, old house, construction work, etc.

The attributes may also include the details of people depicted in the image, such as gender, ethnicity, height, age, demographic, physique, complexion, known personality or public figure, hairstyle, clothing worn, accessories on the person, devices on the person (such as a watch), jewelry worn by the person, etc. Attributes may also include resolution of the image or format of the image, such as jpg, png, or HDR. Additional examples of attributes when a person is depicted in the foreground of a captured image, or when the person is a key focus of the image, are depicted in FIG. 6.

Figure 6:
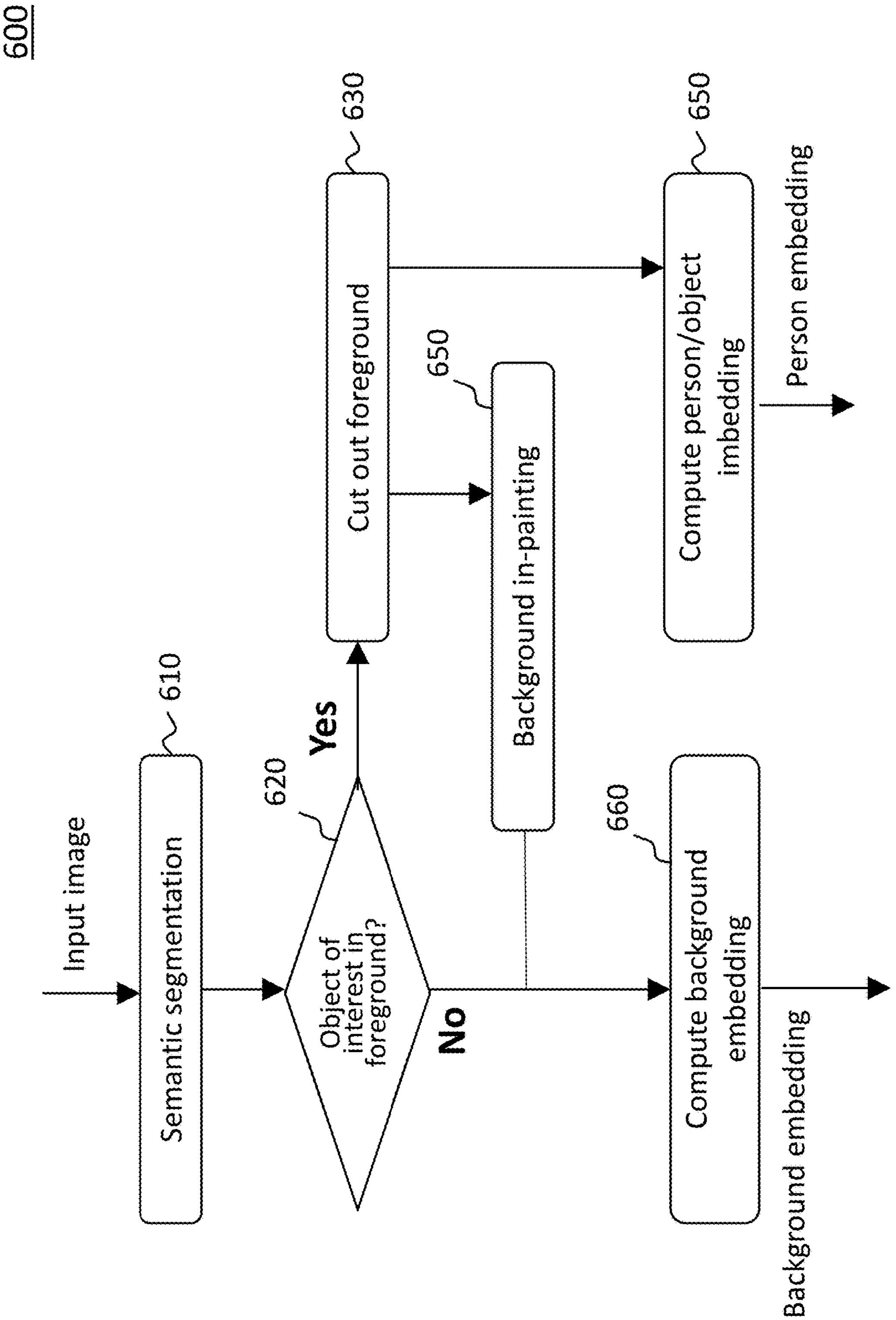
FIG. 6 is a block diagram of an example of a process for segmenting portions of a captured image when a person, animal, or object of interest is detected in its foreground, in accordance with some embodiments of the disclosure.

Process 600 of FIG. 6 may be used to determine attributes when a prominent object, such as a person, is depicted in the foreground of a captured image, or when the object is a key focus of the image, such as in a portrait or group photo of friends. The process 600, as will be described in further detail below, separates the object(s), e.g., individual(s), depicted in the captured image from the background such that attributes of the background can be obtained separately from the attributes of the foreground object(s). Such separation allows the control circuitry to perform a deeper analysis of each subject (background and foreground object(s)) separately for better results. The foreground and background may be separated, for instance, to treat the attributes of the foreground and background differently when looking for reference images. For example, background attributes may be used to obtain reference images with same or similar backgrounds. However, identifying reference images based on foreground objects may not be based on same or similar foreground attributes. For instance, a foreground may include people in a variety of different pose(s), and references images may be identified having foregrounds having people with any number of same, similar, or different poses.

When the individual is separated from the background, the control circuitry performs in-painting of the background to fill in the void of the individual being taken out of the image. The foreground, which includes the image of the individual(s), is then analyzed via application of a deep learning model to extract attributes such as gender, age, and identity, and tasks being perform by the individual(s) in the captured image (such as simply posing for an image or playing a sport, etc.) The process may also include using facial recognition techniques to obtain key facial attributes of the individual(s).

Deep learning models may contain a person as one of the semantic categories, the result will tell whether there is a person segment large enough to be considered as a foreground. If not, the input image will go through another deep learning model [M2] to get an embedding of the image, represented as a vector. If there is a foreground person segment, this semantic foreground part will be cut out from the background, and the remaining background will be in-painted with a deep learning model [M3], before going through the deep learning model [M2] to get background embeddings. The foreground image is person specific and will go through another deep learning model [M4] to extract person-specific embeddings, this model could be obtained by fine-tuning the model [M2] to person attribute-related recognition tasks, like gender, age, and identity.

As described above, separate deep learning models may be applied to the foreground and the background to obtain reference images that are focused on each separately. In this embodiment, once a determination is made that the image depicts one or more individuals in its foreground, a semantic segmentation model may be applied. The application is used to determine whether a percentage of image occupied by the individuals exceeds a predetermined percentage threshold. In other words, is the portion occupied with the individuals large enough and does it occupy a major portion of the picture to be considered as a foreground. When a determination is made that the percentage of image occupied by the individuals exceeds the predetermined percentage threshold, then the portion of the image that is occupied by the individuals is cut out. The background, from which the portion of the image that is occupied by the individuals is cut out, is then in-painted to fill the void of the cut out. Then the background is without any individuals and a deep learning model is applied to find reference images that are focused on the background. Likewise, a separate deep learning model is applied to the foreground which now only has the cut-out images of the individuals.

Figure 13:
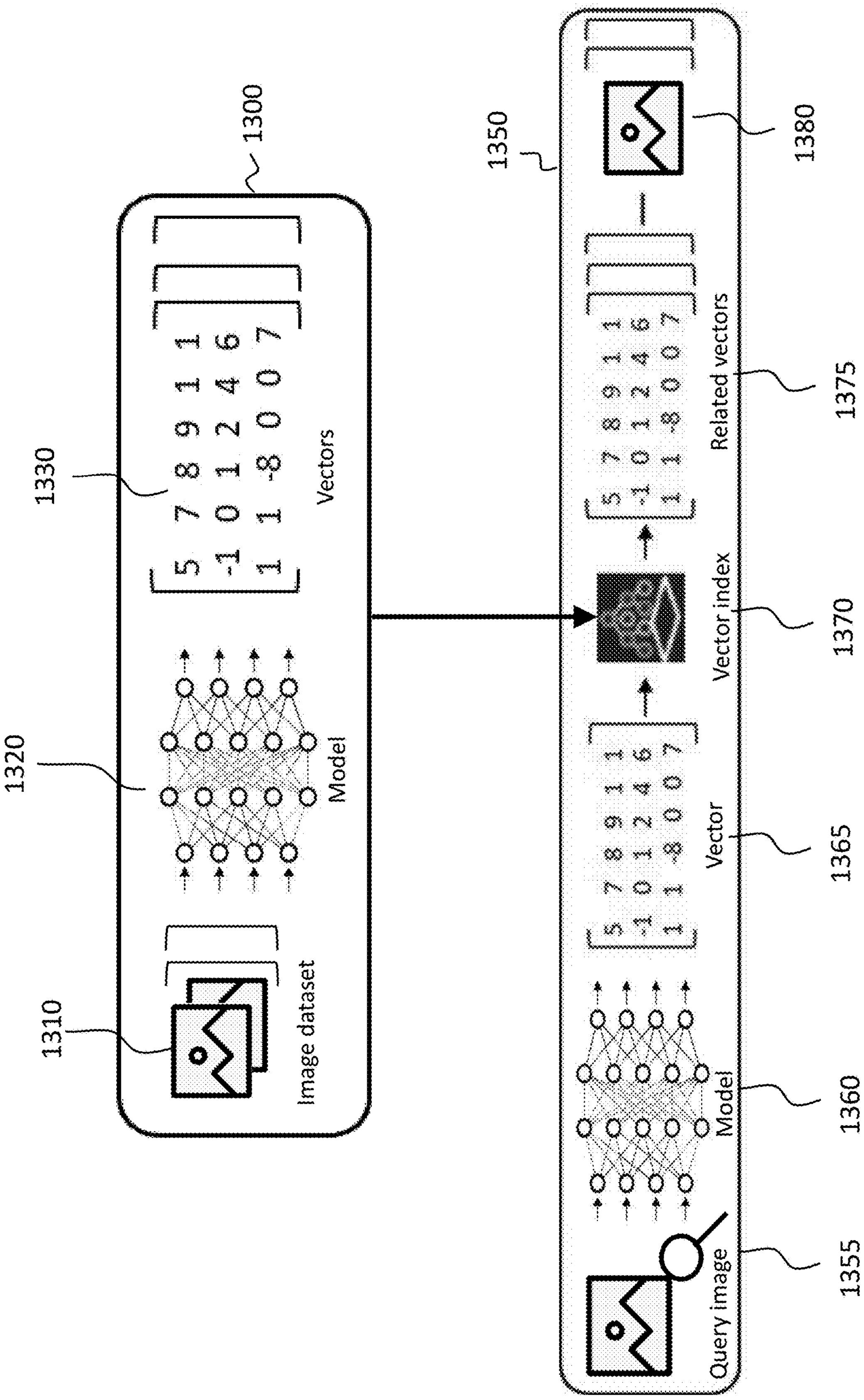
FIG. 13 is an example of a model that uses vector representations of captured images for image enhancements, in accordance with some embodiments of the disclosure.

An example of a deep learning model used when a person is depicted in the foreground of a captured image, or when the person is a key focus of the image, is depicted in FIG. 13, as will be described in further detail below.

The attributes may also include the details of an animal depicted in the image, such as type of animal, age of animal, any special characteristics of the animal, etc. The process 600 may also be applied when the animal is in the foreground or a key focus of the captured image.

The attributes may also include details relating to the image composition, such as 2D vs. 3D image, angle of image, brightness, lighting, lead lines, contrast, framing of the image, depth perception, negative space in image, symmetry, pose, posture, style, etc.

The attributes may also include the lighting conditions under which the image was captured. These conditions may include sunny, cloudy, partly cloudy, bright, dark, etc.

The attributes may also relate to what device is being used to capture the image, for example, a smart phone camera, tablet, smart watch, etc., including the model of the device and device capabilities. The attributes may include the brand, model, version, of the hardware and software associated with the device, etc. The attributes may also include the year of the model and any other details associated with the model of the device.

The attributes may also include details relating to who was taking the picture, such as a certain user, photographer, etc. The details may include whether the photographer is a recognized personality and may include the ratings of the photographer, if any. For example, if an animal image was taken by a well-known wildlife photographer, such information may be ascertained in the attributes.

In some embodiments, the attributes of the image to be captured may also be used to calculate a vector matrix. In this embodiment, the control circuitry may apply a deep learning model to the image and its various attributes and generate a vector representation of the image to be captured. The control circuitry may also determine different vector representations for the foreground and background of the image. The control circuitry may also determine vector representations based on a percentage of the total image occupied by any one or more attributes, such as the house occupying a large percentage of the image. In some embodiment, the deep model may convert an attribute of an image, such as a pixel-based raster image, into mathematical lines, shapes, equations, and data that can be associated with details of the attribute, such as its size, etc.

At block 103, the obtained attributes may be used to query a server for reference images. In some embodiments, the control circuitry 220 and/or 228 may query a storage that is local to the device instead of a server. In other embodiments, the control circuitry 220 and/or 228 may query one or more servers. The servers may be private or public servers. The servers may also be associated with service providers that store stock images, such as iStock Photo™, Shutterstock™, Adobe™, Getty Images™, etc. The servers or databases queried may also belong to professional photographers, artists, studios, or anyone else who stores professionally taken images or images that are of professional or high quality.

In some embodiments, the user or control circuitry 220 and/or 228 may follow certain individuals, such as friends, family, or colleagues of the user, or individuals who are recognized as professional photographers. The user or the control circuitry 220 and/or 228 may also maintain a list of photographers or individuals that the user likes to follow. In such embodiments, databases and servers associated with individuals that the user or control circuitry 220 and/or 228 follows are queried for reference images.

The query may use one or more attributes of the captured image to query the server or database. For example, as depicted in block 103, the search query may include attributes that identify the image as being a home that has a chimney, being taken in San Jose, CA, being taken by a Pixel phone model 8.0, and being a 3D image. Although multiple attributes are used to build the search query, even just one attribute may be selected.

Although a query has been used as an example to determine whether a server, or a database associated with the server, stores reference images that include attributes of the captured image, the embodiments are not so limited. In other embodiments, instead of sending a query, the user device (also referred to as electronic device) may transmit the captured image to the server for the server to perform its own searching to determine whether the server, or one or more databases associated with the server, stores reference images that include attributes of the captured image. In yet another embodiment, instead of transmitting the image, the user device may transmit a vector representation of the image to the server. In yet more embodiments, images, attributes, and/or their vector representations may be encrypted during transmission. The process of using vector representations and deep learning to match the captured image with reference images is described in further detail in connection with FIG. 13 below.

At block 104, based on the search query, the server may identify a plurality of reference images that include one or more attributes used as part of the search query. For example, reference image 1 depicted at block 104 includes attributes house and chimney that are common with the attributes of the captured image used in the search query at block 103.

In some embodiments, the attributes that are associated with the reference image may be similar to the attributes used as part of the search query. For example, any reference image with a chimney could be considered as having a similar attribute as the chimney in the captured image.

In other embodiments, the attributes that are associated with the reference image may be required to have a higher degree of similarity, such as above a predetermined threshold of similarity, before they can be considered to have an attribute similar to the attribute in the captured image. For example, the predetermined threshold may be set at 65%. This would mean that, for example, the chimney in the reference image would need to have 65% of similarity with the captured image for the reference image to be considered as a potential reference image that could be used in the process 100.

As depicted in block 104, in some embodiments, four homes that include one or more attributes that are similar to the attributes captured in the image at block 101 and used as part of the search query at block 103 are identified.

As described earlier, these reference images may be stored in or obtained from one or more servers and their associated databases. The reference images may be obtained from these servers by a plurality of mechanisms. For example, the reference images may be taken by a user that is associated with the server and stored in a database associated with the server. In other embodiments, the servers may obtain the reference images from crowdsourcing and store them in a database associated with the server. In yet other embodiments, the companies or individuals that own or operate the servers may purchase the images or pay professional photographers to take images and then store them in a database associated with the server. The images may also be collected from social media or group photo sharing sites.

Whatever may be the means of obtaining these images, when the images are obtained, they may be scored and ranked for their aesthetic score. Some categories utilized by the control circuitry for computing an aesthetic score are described in FIG. 9. The aesthetic score associated with the reference image may be used as a quality measure to determine the quality and professional look of the image. The higher the quality of the image, the higher the aesthetic score. For example, an image that follows some of the professional photography rules, such as the rule of thirds, adhering to depth perception, framing the image such that key parts of the image are pronounced, using proper lighting, and ensuring that symmetric rules are applied when taking the image, would result in a higher aesthetic score than those that do not.

As depicted at block 105, in some embodiments, the aesthetic score for reference image 1 is 62, for reference image 2 is 45, for reference image 3 is 58, and for reference image 4 is 77. Since reference image 4 includes a well-composed 3D image of a home, it received a higher aesthetic score than reference image 2, which is a 2D image of a home and not as appealing as reference image 4. As mentioned above, the aesthetic score is a combination of several factors, such as those described in FIG. 9, and represents the overall quality of the image.

At block 105, the control circuitry 220 and/or 228 also calculate the matching score of each identified reference image with the attributes selected for querying. For example, there are seven attributes used for the image captured at block 101. These seven attributes are 1) home, 2) chimney, 3) San Jose, 4) Pixel 8.0, 5) cloudy, 6) tree, and 7) 3D view.

In some embodiments, the matching score, also referred to as the visual matching score, may be associated with the number of search query attributes present in the identified reference image. In other words, in some embodiments, the visual matching score may be solely dependent on the number of attributes present. For example, the reference image will score a higher visual matching score if it includes a higher the number of the search attributes and the reference image will score a lower visual matching score if it includes a lower number of the search attributes.

In other embodiments, the visual matching score may be dependent on whether it includes certain key attributes. For example, if a home has been identified as a key attribute and tree has not, then the reference image having a home would score a higher visual matching score than a reference image that includes trees and no house.

In yet other embodiments, the visual matching score may be weighted, and certain weights may be associated with certain attributes. If the reference image includes the weighted attributes, it may score higher in the visual matching score.

At block 105, a combined score may be calculated by the control circuitry 220 and/or 228. The combined score, in some embodiments, may be an average of the visual matching score and the aesthetic score. In other embodiments, the combined score may be a mean or a standard deviation, or it may be based on another predetermined formula. In some embodiments, the reference image may be rank ordered in an order based on its combined score.

At block 106, one or more reference images may be displayed on the user device. Which reference images to display may depend on their combined score. For example, reference images that do not meet or exceed a predetermined combined score threshold may not be displayed on the user device. Such reference images may be considered not relevant to the captured image. The lack of relevance may be due to their lack of similarity to the captured image, such as not sharing enough attributes with the captured image or not sharing key attributes. The lack of relevance may also be due to their aesthetic score not meeting the quality standards that are predetermined by the user or the control circuitry 220 and/or 228.

The reference images may be displayed on the user device is a variety of formats. As depicted in block 106, Format 1 may be used where reference images that are selected for display are presented in a tile format on the user device. The user may be provided the ability to scroll top to bottom or left to right to select any one or more of the reference images to enhance their captured image.

In some embodiments, Format 2 may be used, where reference images that are selected for display are presented at the bottom of the user interface on the user device. In this format, the captured image may be shown larger and on top, while tiles of reference images that are scrollable are displayed underneath the captured image. The user may be provided the ability to scroll top to bottom or left to right to select any one or more of the reference images to enhance their captured image. Additional examples of display formats are provided in FIGS. 10-12 below.

Block 107, in some embodiments, provides enhancement options that may be used to enhance the captured image based on selection of one or more reference images displayed at block 106.

In some embodiments, the user of the electronic device may select one or more reference images displayed at block 106. The user may incorporate image-composing techniques used in the selected reference image or images to enhance the captured image. The user may either perform the incorporation manually or invoke a step-by-step guide that will assist the user in applying the image-composing techniques used in the selected reference image to enhance the captured image or images. For example, the user may desire to incorporate the techniques used in a reference image to have better lighting in the captured image. The user may also desire to incorporate the framing techniques used in the reference image. They may also desire to focus on their subject in the captured image and have similar effect of showcasing their subject as the reference image does. As such, the user may invoke a step-by-step guide that provides guidance to the user to obtain effects in the captured image that are similar to those in the selected reference image.

In some embodiments, the step-by-step guidance may be visual, auditory, or both. For example, a visual guidance that uses arrows pointing to framing of the captured image or providing guidance on what features of the camera to configure on the user device may be presented to the users. The audio guidance may provide audio that directs and explains to the user on how to operate their device or what steps to take to capture the image to obtain the same effect as in the selected reference image. In other embodiments, step-by-step guidance may be provided by a digital assistant, such as Google Assistant™ or Siri™. In such embodiments, the digital assistant may guide the user through voice instructions step-by-step and may provide further guidance when the user makes a mistake or has a follow-up question to the digital assistant.

Figure 9:
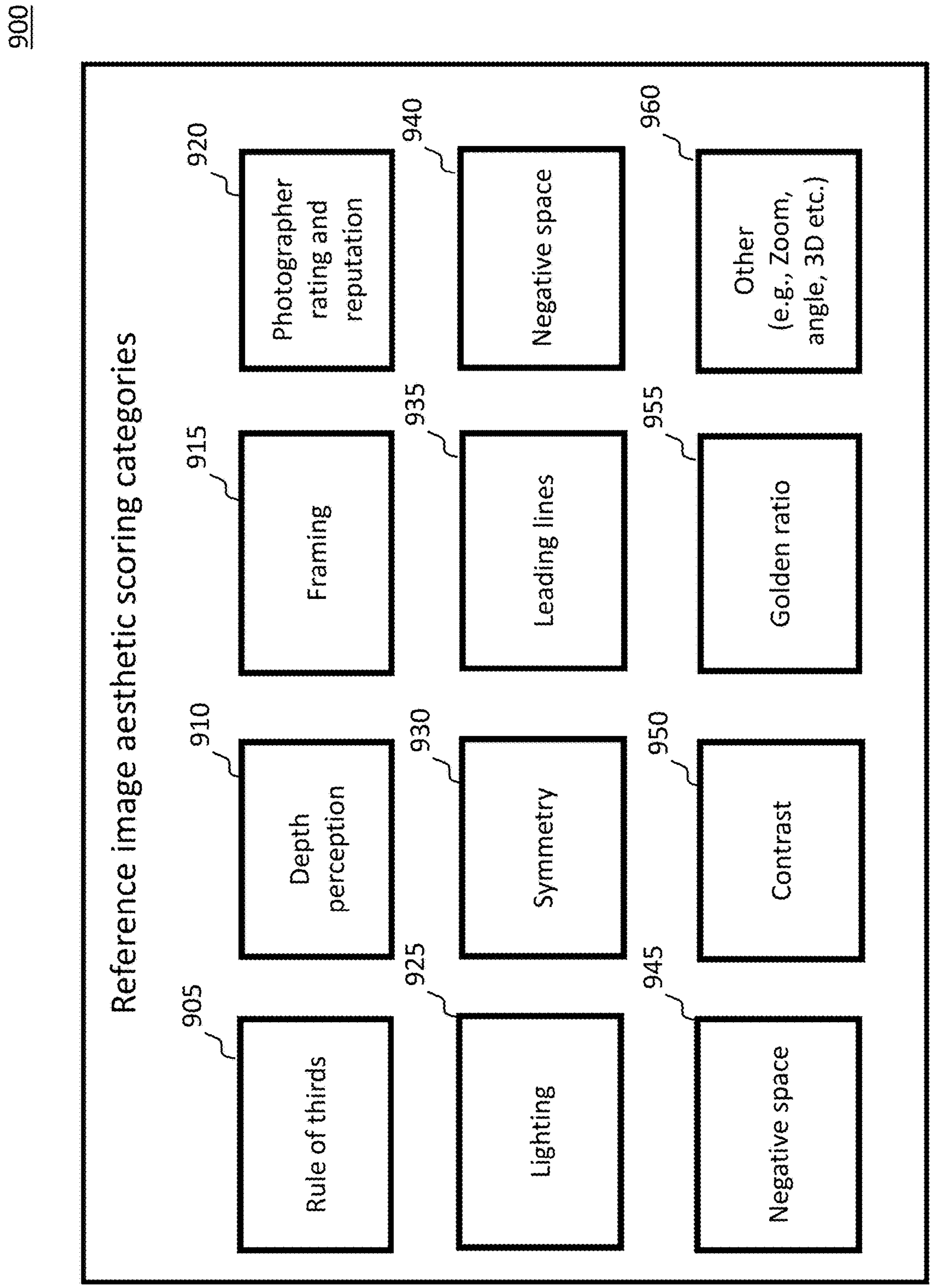
FIG. 9 is a block diagram of reference image aesthetic scoring categories, in accordance with some embodiments of the disclosure.

In other embodiments, the user of the electronic device may select multiple reference images from the reference images displayed at block 106. The user may select one or more features or attributes from each of the selected reference images, of the multiple reference images, to have the same effect in their captured image as in the attributes selected in the multiple reference images. For example, from a first reference image, the user may want to have a similar contrast in their captured image, and from a second reference image, the user may want to have a similar framing of the key subject. As such, both selected attributes from the multiple reference images may be incorporated into the captured image. As mentioned above, the user may either perform the incorporation manually or invoke the step-by-step guide to assist the user in applying the techniques used in the selected multiple reference images to enhance the captured image. Some examples of enhancement categories that the user may select from are depicted in FIG. 9, which are the same as the categories used for scoring the reference image's aesthetic quality.

In some embodiments, the user of the electronic device may select one or more reference images displayed at block 106 to automatically apply same techniques used in the selected reference images to the captured image (or to be captured image) such that the captured image (or to be captured image) may be enhanced to have similar effects as in the selected reference images. For example, if a technique used in a reference image produces certain lighting or contrast, then the same technique may be automatically applied to the image to be captured such that it may also have similar lighting or contrast. In other embodiments, the control circuitry 220 and/or 228 may invoke an artificial intelligence (AI) engine to execute an AI algorithm for automatically selecting one or more reference images and automatically enhancing the captured image based on the automatically selected reference images.

In some embodiments, the electronic device used for capturing the image may be automatically configured by the control circuitry 220 and/or 228. In some embodiments, once the user selects one or more reference images, or if the reference images are automatically selected by the control circuitry 220 and/or 228, the control circuitry 220 and/or 228 may configure the user device settings such that the configured settings allow the user to capture the image to have effects similar to those of the reference images. For example, the control circuitry 220 and/or 228 may configure the brightness setting, turn on the flash, shift the camera to portrait mode, or perform one or more other setting configurations that are provided by the electronic device. Configuring such settings may allow the user to obtain similar effects of the selected reference image, such as similar brightness, in the captured image.

Figure 3:
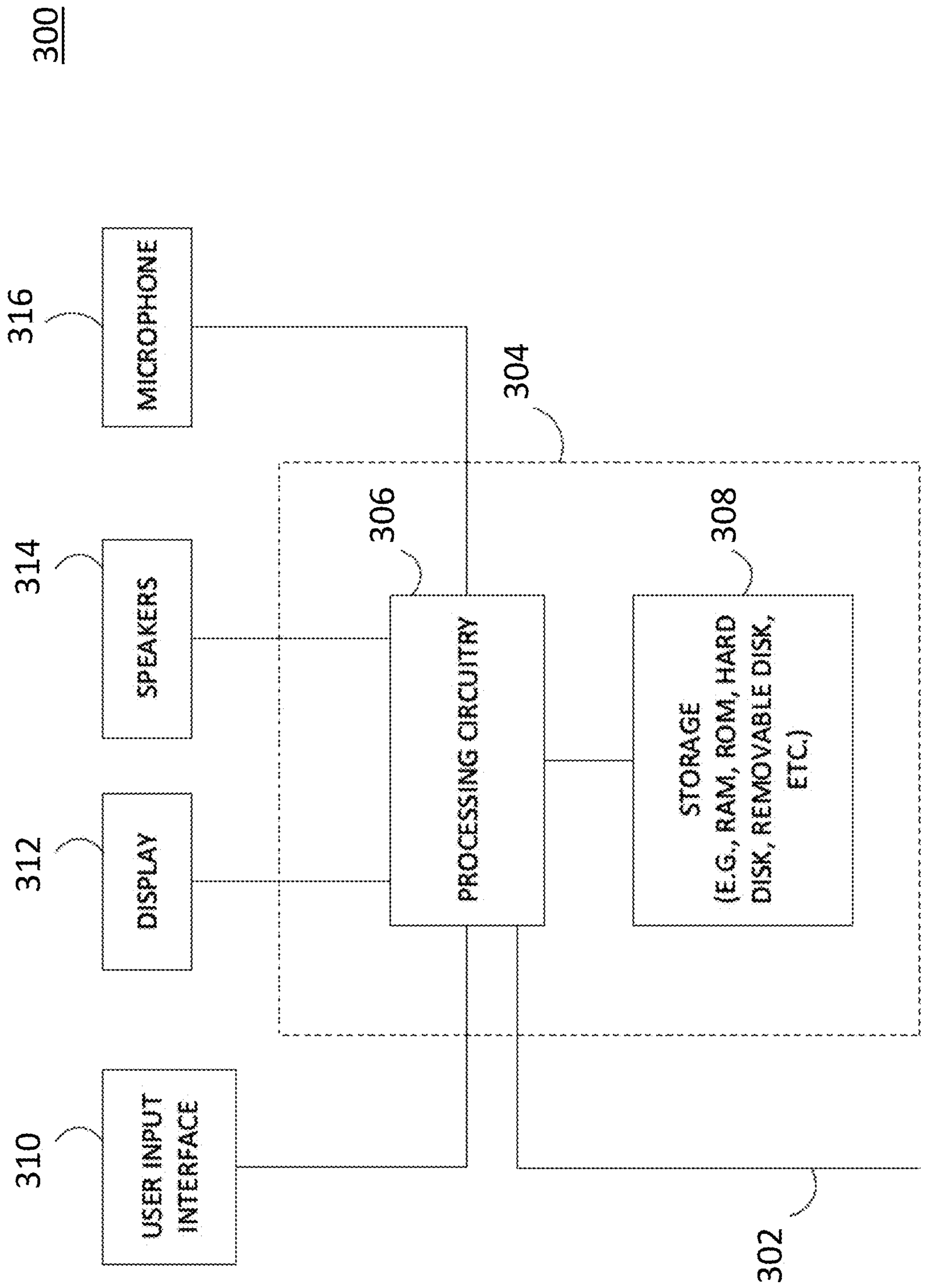
FIG. 3 is a block diagram of a user device used for capturing an image and enhancing the captured image, in accordance with some embodiments of the disclosure.

FIG. 2 is a block diagram of an example system for enhancing a captured image based on one or more reference images, in accordance with some embodiments of the disclosure and FIG. 3 is a block diagram of a user device used for capturing an image and enhancing the captured image, in accordance with some embodiments of the disclosure. FIGS. 2 and 3 also describe example devices, systems, servers, and related hardware that are configured to implement processes, functions, embodiments, and functionalities described in relation to FIGS. 1 and 4-14. Further, FIGS. 2 and 3 may be configured to receive or process captured or preview images and obtain their attributes, to segment preview images into separate segments or classes of objects (e.g., when the preview image includes a depiction of a person), and to receive and analyze reference images and obtain their attributes. In embodiments disclosed herein, the system and devices of FIGS. 2 and 3 are configured to generate a query based on the attributes (or vector representation thereof) of the preview image, and the query may be used to search one or more databases or servers to identify relevant reference images that correspond to a preview image. For example, relevant reference images may include one or more of the queried attributes of the preview image, may have similar or matching computed aesthetic scores, visual scores, and/or combined scores, correspond to identified reference objects that exceed a predetermined combined score threshold, etc. The system and devices of FIGS. 2 and 3 are further configured to display the reference objects in various formats on a user device used for capturing an image, provide user guidance to capture the image based on one or more reference images, automatically enhance the captured image based, for instance, on a selected reference image, automatically perform device configurations for a user electronic device based on the selected reference image, provide step-by-step guides, or use attributes of multiple reference images to enhance the captured image. Further, the system and devices of FIGS. 2 and 3, in various embodiments disclosed herein are configured to generate vector representations of the preview image, apply deep learning models to the generated vector representations, and execute algorithms, such as artificial intelligence algorithms, and algorithms associated with models depicted in FIG. 13, for instance.

In some embodiments, one or more parts of, or the entirety of system 200, may be configured as a system implementing various features, processes, functionalities and components of FIGS. 2 and 3. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as media device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content, metadata, and or other types of data (e.g., they can be used to store images captured, vector representations of the captured images, aesthetic scores, matching visual scores, and combined scores of reference objects, attributes associated with captured images and reference images, similarities and matching of attributes between captured images and reference images, user enhancement used historically by the user, user pattern on selection of reference images, use profile and information in the user profile, such as the people, friends, colleagues, photographers followed by the user such that reference images from such people can be used, segmentation details of an image when it is segmented into background and foreground, display options provided, display options preferred by user, and algorithms used for enhancing the captured image). Non-volatile memory may also be used (e.g., to launch a boot-up routine and other instructions). Cloud-based storage may be used to supplement storages 224, 238 or instead of storages 224, 238. In some embodiments, data relating to images captured, vector representations of the captured images, aesthetic scores, matching visual scores, and combined scores of reference objects, attributes associated with captured images and reference images, similarities and matching of attributes between captured images and reference images, user enhancement used historically by the user may be recorded and stored in one or more of storages 212, 238. The data relating to user pattern on selection of reference images, use profile and information in the user profile, such as the people, friends, colleagues, photographers followed by the user such that reference images from such people can be used, segmentation details of an image when it is segmented into background and foreground, display options provided, display options preferred by user, algorithms used for enhancing the captured image, and data relating to all other processes and features described herein, may also be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to determining that an image has been captured, that an image is in a viewfinder of a display associated with a camera, or that the captured image include depiction of people, the control circuitry 228 may perform the steps of process described in FIGS. 1, 4, and 6 and all the steps and processes described in all the figures depicted herein.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another embodiment of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as objects, frames, snippets of interest, and input from primary devices and secondary devices, such as AR devices. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a personal computer television (PC/TV), a PC media server, a PC media center, a handheld computer, a mobile telephone, a smart phone, a virtual, augment, or mixed reality device, or a device that can perform function in the metaverse, or any other device, computing equipment, or wireless device, and/or combination of the same capable of capturing an image and enhancing the image based on reference images.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core 19 processor). In some embodiments, control circuitry 220 and/or control circuitry 218 are configured to receive captured images and obtain their attributes, receive reference images and obtain their attributes, apply deep learning model to analyze an image to be captured and obtain specific attributes of objects within the image, calculate a vector matrix for the image to be captured, determine vector representations of the image to be captured, segment captured images into separate segments when the captured image includes depiction of a person, generate a query based on the attributes of the capture image and use it to query one or more servers, identify reference images that include one or more of the queried attributes of the captured image, compute aesthetic scores, matching visual scores, and combined scores of reference objects. The control circuitry 220 and/or control circuitry 218 are further configured to identify reference objects that exceed a predetermined combined score threshold, display the reference objects in various formats on the user device used for capturing the captured image, provide guidance to user associated with user electronic device to capture the image based on selected reference image. The control circuitry 220 and/or control circuitry 218 are further configured to automatically enhance the captured image based on selected reference image, automatically perform device configurations for user electronic device based on the selected reference image, provide step-by-step guides, use attributes of multiple reference images to enhance the captured image, generate vector representations of the captured image, apply deep learning models to the generated vector representations and execute all algorithms, such as artificial intelligence algorithms, and algorithms associated with models depicted in FIG. 13, to enhance the captured image based on one or more selected reference images, and all other processes and features described herein.

Computing device 218 receives a user input 204 at input circuitry 216. For example, computing device 218 may receive a user input like capturing of an image, activation of a camera to capture the image, or image in a display associated with the camera used for capturing the image.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4, and 6, respectively.

FIG. 3 shows a generalized embodiment of an electronic equipment device 300, in accordance with one embodiment. In an embodiment, the equipment device 300, is the same equipment device 202 of FIG. 2. The equipment device 300 may receive content and data via input/output (I/O) path 302. The I/O path 302 may provide audio content (e.g., broadcast programming, on-demand programming, internet content, content available over a local area network (LAN)

or wide area network (WAN), and/or other content) and data to control circuitry 304, which includes processing circuitry 306 and a storage 308. The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), Graphical processing units (GPUs) etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The communications between two separate user devices, such as the sending electronic device and the receiving electronic device to send a captured image, or communications between two separate user devices, such as the sending electronic device and the server, to receive captured images and obtain their attributes, apply deep learning model to analyze an image to be captured and obtain specific attributes of objects within the image, calculate a vector matrix for the image to be captured, determine vector representations of the image to be captured, receive reference images and obtain their attributes, segment captured images into separate segments when the captured image includes depiction of a person, generate a query based on the attributes of the capture image and use it to query one or more servers can be at least partially implemented using the control circuitry 304. The communications between two separate user devices, such as to identify reference images that include one or more of the queried attributes of the captured image, compute aesthetic scores, match visual scores, and combined scores of reference objects, identify reference objects that exceed a predetermined combined score threshold, display the reference objects in various formats on the user device used for capturing the captured image, provide guidance to user associated with user electronic device to capture the image based on selected reference image, automatically enhance the captured image based on selected reference image, automatically perform device configurations for user electronic device based on the selected reference image, provide step-by-step guides, use attributes of multiple reference images to enhance the captured image, generate vector representations of the captured image, apply deep learning models to the generated vector representations, and all other processes and features described herein, can be at least partially implemented using the control circuitry 304. In some embodiments, once the deep learning model is applied to the image, a vector representation of the image based on the deep learning model application may be generated. In other words, applying the deep learning model may provide the vector representation as an output. This can be performed as separate steps or together as a single step. The processes as described herein may be implemented in or supported by any suitable software, hardware, or combination thereof. They may also be implemented on user equipment, on remote servers, or across both.

In client-server-based embodiments, the control circuitry 304 may include communications circuitry suitable for allowing communications between two separate user devices to receive captured images and obtain their attributes, receive reference images and obtain their attributes, segment captured images into separate segments when the captured image includes depiction of a person, generate a query based on the attributes of the capture image and use it to query one or more servers, identify reference images that include one or more of the queried attributes of the captured image, compute aesthetic scores, matching visual scores, and combined scores of reference objects. The control circuitry 304 may further include communications circuitry suitable to identify reference objects that exceed a predetermined combined score threshold, display the reference objects in various formats on the user device used for capturing the captured image, provide guidance to user associated with user electronic device to capture the image based on selected reference image, automatically enhance the captured image based on selected reference image, automatically perform device configurations for user electronic device based on the selected reference image, provide step-by-step guides, use attributes of multiple reference images to enhance the captured image, generate vector representations of the captured image, apply deep learning models to the generated vector representations, and all related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase “electronic storage device” or “storage device” should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store images captured, vector representations of the captured images, aesthetic scores, matching visual scores, and combined scores of reference objects, attributes associated with captured images and reference images, similarities and matching of attributes between captured images and reference images, user enhancement used historically by the user, user pattern on selection of reference images, use profile and information in the user profile, such as the people, friends, colleagues, photographers followed by the user such that reference images from such people can be used, segmentation details of an image when it is segmented into background and foreground, display options provided, display options preferred by user, and algorithms used for enhancing the captured image, and AI algorithms and all the functionalities and processes discussed herein. Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri™, Alexa™, Google Home™ and similar such voice assistants) receive and process the voice commands and other speech.

The electronic device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing artificial intelligence (AI) algorithms, and all the functionalities discussed associated with the figures mentioned in this application.

The electronic device 300 of any other type of suitable user equipment suitable may also be used to implement AI algorithms, and related functions and processes as described herein. For example, primary equipment devices such as smart phone, smart camera, smart watch, and other wireless user communication devices, or similar such devices may be used. Electronic devices may be part of a network of devices. Various network configurations of devices may be implemented and are discussed in more detail below.

FIG. 4 is a flowchart of an example of a process for enhancing a captured image based on one or more reference images, in accordance with some embodiments of the disclosure. The process 400 may be implemented, in whole or in part, by systems or devices such as those shown in FIGS. 2-3. One or more actions of the process 400 may be incorporated into or combined with one or more actions of any other process or embodiments described herein. The process 400 may be saved to a memory or storage (e.g., any one of those depicted in FIGS. 2-3 as one or more instructions or routines that may be executed by a corresponding device or system to implement the process 400.

At block 405, the control circuitry, such as the control circuitry 220 and/or 228 shown in FIGS. 2-3, may receive an image captured by an electronic device. The image may either be already captured by an electronic device, such as a picture taken, or the image may be in the viewfinder, i.e., display screen or see-through glass, of the electronic device and not yet captured. Process 400 is applicable to both images that are captured or images that are in the viewfinder of the electronic device. Process 400 is also applicable to images that are stored in a photo library. Process 400 is further applicable to an image that is attached in an outgoing message and not yet sent to the recipient.

The electronic device used to capture the image may be a smart phone, smart watch, laptop, tablet, or any other device that includes a camera, or is associated with a camera, and is capable of capturing an image or has capability to receive an input of an image. An autonomous automobile may also be used to capture the image. A security camera and a video doorbell are some additional examples that can be used to capture an image. In additional embodiments, the image may also be captured via smart glasses, augmented reality devices, or head mounted displays.

In some embodiments, an image captured may contain scenery or some background. In other embodiments, the image may include one or more individuals or animals that are in the foreground of the image or a key element of the image. If the image captured is scenery or some background or any other type of image in which a person, animal, or some object of interest is not in the foreground of the image or a key element of the image, then blocks 410-470 of process 400 may be applied. In other embodiments, if person, animal, or some object of interest is in the foreground of the image or a key element of the image, then the image may be segmented into two parts, one containing a person, animal, or some object of interest as foreground or key element of the image, and one that does not include the person or animal. In one embodiment, the search image, which is the preview image captured that does not contain a person, animal, or some object of interest as foreground or key element, may be used to directly obtain and rank reference images from a server or database that include attributes of the inquiry image. In another embodiment, in the inquiry image that includes a person, animal, or some object of interest in the foreground, the background is concatenated such that reference images that include the same, or another, person (or object of interest) is used to obtain and rank reference images from a server or database that include attributes of the person or animal in the inquiry image. As such, when a person or animal (or some objects of interest) is in the image, process 400 may be applied separately for both parts of the image, i.e., the part that does not include the person or animal and the part that does. Accordingly, at block 410 of the process, attributes may be obtained for both parts of the segmented image, as further described in the description of FIG. 6.

Once an image is received by the control circuitry 220 and/or 228, its attributes are obtained. In some embodiments, a deep learning model may be used to analyze the image and obtain specific attributes of objects of interest and all other objects that are depicted in the images. If the image contains both people and animals (or some objects of interest) that are in the foreground and a background, then the attributes of all that is depicted in the image may be obtained, either separately or together. Separate processing of the image when a person or animal is depicted is described in FIG. 6.

Figure 7:
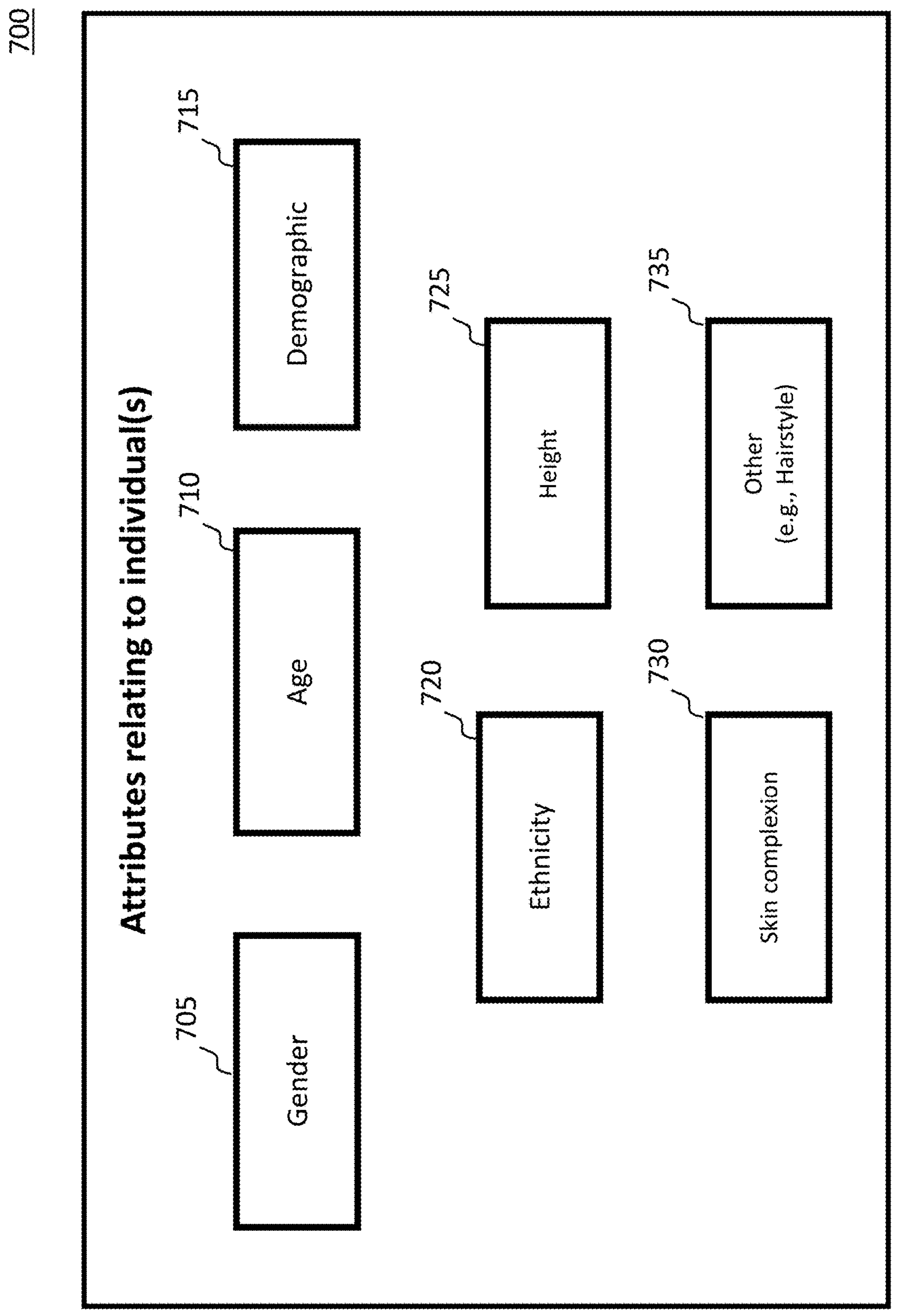
FIG. 7 is a block diagram of example of categories of attributes that can be obtained when individual(s), animals, or objects of interest are depicted in a captured image, in accordance with some embodiments of the disclosure.

Some examples of attributes obtained include the attributes of the background of the image. Such attributes may describe the background or the setting of the image. In other words, the attributes may be used to ascertain various details of the image and its location. These details may include determining that the location is a beach, city view, view of a park, a company, indoors, or outdoors or that the lighting conditions of the background are sunny, cloudy, partly cloudy, bright, dark, etc. The attributes may also include details relating to the image composition, such as 2D vs. 3D image, angle of image, brightness, lighting, lead lines, contrast, framing of the image, depth perception, negative space in image, shadows projected on the image or part of the image, symmetry, pose, posture, style, etc. The attributes may also include details of the subject or focus of the image, such as the image being focused on a lamp, tree, flowers, landmark (such as Eiffel tower), a company building or whatever else is depicted in the image. If the image includes a person or animal (or some objects of interest), then the attributes that describe the person may be obtained. Examples of such attributes are depicted in FIG. 7.

The attributes obtained at block 410 may also relate to what electronic device is being used to capture the image, including the make and model of the device, the operating system (OS) used by the device, including the OS version, and device capabilities. Since device settings, camera features, and processing capabilities may differ from device to device and from one version of a device to another, the control circuitry may access the device and determine such capabilities such that device configurations, or suggestions to a user to capture a photo, is based on an understanding of what the device can and cannot do. For example, if the electronic device is a smart phone, such as an Apple iPhone™, the device capabilities may include a special color correction filter or ability to capture an image with an 8K resolution. The control circuitry may access the Apple iPhone to determine its device capabilities and accordingly configure the device such that the image can be captured with a higher color correction or 8K resolution. If the electronic device is a smart watch, due to the small size of the smart watch, most camera functions are basic, and the smart watch may not have a processer that has the same capabilities as the more powerful processor in a smart phone. Accordingly, the control circuitry may access the smart watch to determine its limited or basic device capabilities and accordingly configure the smart watch such that the image can be captured based on the smart watch's capabilities.

The attributes may also include details relating to who was taking the picture, such as a certain user, photographer, etc. The details may include whether the photographer is recognized personality and may include the ratings of the photographer, if any. For example, if an animal image was taken by a well-known wildlife photographer, such information may be ascertained in the attributes. The attributes may also include details or the surrounding and circumstances in which the picture was takes, such a season (e.g., winter or summer), weather conditions, such as rain, temperature, wind velocity, etc.

At block 415, the control circuitry 220 and/or 228 of the user device may generate a search query based on the captured image (or image in the viewfinder) and transmit the search query to a server. The query generated by the control circuitry 220 and/or 228 of the user devices may include one or more, or all, attributes obtained at block 410 related to the captured image. For example, the search query generated may use attributes such as location (e.g., San Jose), and key elements, such as the subject of the image being a house, and that it was taken on a cloudy day. One of the objectives of the search query may be to obtain reference images that are similar to the captured image, e.g., also taken in San Jose of other houses under cloudy conditions, and of a professional or higher quality. The location information may be obtained by accessing a GPS locator of the user device.

The user may desire to use the reference images of higher quality, e.g., reference images with a) a matching visual score above a predetermined threshold, b) an aesthetic score above a predetermined threshold, or c) a combined score of matching visual score and aesthetic score above a predetermined threshold. The user may desire to adopt photography techniques or device configurations that were used to capture the reference images to capture their subject, e.g., the house in San Jose, in a higher quality such that their captured image has the same effect as the reference image.

To do so, the control circuitry 220 and/or 228 associated with the user device may transmit the search query to the server at block 415. In some embodiments, the user device may query multiple servers. In other embodiments, the user device may query a specific server, such as a server associated with a well-known photographer or a company that stores stock images. In yet other embodiments, the user device may query a storage that is local to the user device, such as a cloud storage associated with the user device, instead of a server.

In some embodiments, the user or control circuitry 220 and/or 228 may follow certain individuals, such as friends, family, or colleagues of the user, and query a server that is associated with the one or more selected individuals.

In some embodiments, the user or control circuitry 220 and/or 228 may query servers that are identified as servers that store a certain type of content or are associated with particular geography. For example, servers that are associated with real estate may be queried if the image being captured is for a home that will be placed on sale. In another example, servers that are associated with location or a specific monument, such as the Taj Mahal in Agra, India, may be queried if the image being captured is of the Taj Mahal by itself or of friends or family that are in the foreground of the Taj Mahal.

As described above, the query may use one or more attributes of the captured image as well as identify the device on which the image is being captured. Listing the device model and version in the search query may benefit the user in limiting to those reference images that were also taken by the same device. The benefit may include the user being able to configure their own device to the same settings as a reference image taken by the same device with the same model and version.

In some embodiments, a server may receive the search query transmitted by the user device. In other embodiments, the server, instead of receiving a search query, may receive the captured image itself and then generate its own query based on attributes extracted from the captured image. In yet another embodiment, the server may receive a vector representation of the captured image and use that to generate its own query based on attributes extracted from the vector representation.

At block 435, the server, which receives the search query, may determine whether any one or more reference images stored by the server, such as at a storage associated with the server, include one or more attributes of the captured image.

The process on the server side includes steps 420-430 where reference images are obtained by the server from various sources, evaluated for their aesthetic quality, and stored in a database associated with the server. The decision process at block 435 examines these reference images from blocks 420-430 that have been curated for their aesthetic quality (at block 425), categorized based on their attributes (at block 430), and stored in a database.

The process of obtaining reference images, computing their aesthetic score, and categorizing begins at block 420, where reference images are received by the server from the user device. In some embodiments, the reference images may be obtained from a user who is associated with the server and stored in a database associated with the server. In other embodiments, the reference images may be obtained from crowdsourcing from a plurality of users by querying them to send certain types of images. In yet other embodiments, reference images may be obtained from companies or individuals that own or operate the servers, such as companies that store stock images. The reference images may also be obtained from social media or group photo sharing sites.

Once the reference images are obtained, at block 425, an aesthetic score is calculated for each reference image. Some categories on which aesthetic scores are based are included in FIG. 9. The aesthetic score associated with the reference image may be used as a quality measure to determine the quality and professional look of the image. The control circuitry 220 and/or 228 may calculate the aesthetic score and use it as a measure for curating reference images to retain only the higher-quality reference images. For example, the control circuitry 220 and/or 228 may determine an aesthetic score threshold and only save reference images that meet the threshold in a database and discard the remaining reference images obtained that do not meet the threshold. A reference image having an aesthetic score above the threshold indicates it is of higher quality and that some of the professional photography rules, such as the rule of thirds, adhering to depth perception, framing the image such that key parts of the image are pronounced, using proper lighting, and ensuring that symmetric rules are applied, to name a few, were followed by a photographer that captured the reference image.

At block 430, in some embodiments, reference images may be categorized based on attributes. They may also be indexed and stored in a database based on their obtained attributes. For example, the control circuitry 220 and/or 228 may store and index all reference images related to animals in an animal category and all reference images relating to a certain location, such as San Francisco, in a San Francisco category such that they may be easy to search and find.

At block 435, as mentioned above, the one or more reference images that have undergone process 420-430 may be evaluated to determine if they possess one or more attributes of the search query. If a determination is made, at block 435, that the one or more reference images do not include attributes similar to the queried attributes, then the process may end, at block 440. In other embodiments, if a determination is made that the one or more reference images do not include attributes similar to the queried attributes, the server may query other servers to obtain additional reference images that include the search attributes.

If a determination is made, at block 435, that the one or more reference images include attributes similar to the queried attributes, then the process may move to block 445, where the reference images that include the one or more queried attributes are identified.

At block 450, the control circuitry 220 and/or 228 may compute a matching score, also referred to as visual matching score, for the identified reference images. The visual matching score, in one embodiment, may be based on a reference image including the search query attributes and the degree or level of similarity between the attributes shared by the reference image and the search query. The visual matching score may be used to determine the degree of similarity between the reference image and captured image. For example, if a search attribute is a house with a chimney, the visual matching score would determine first whether the reference image includes a house with a chimney and second the degree of similarity between the house with the chimney of the reference image and the queried attributes. In other embodiments, the visual matching score may be based on the reference image including the attributes of the search query and not so much on the degree of similarity between the attributes.

In some embodiments, the visual matching score may be solely dependent on the number of attributes present, and in other embodiments, the visual matching score may depend on whether the reference image includes certain key attributes of the search query or includes a higher degree of similarity between the attributes of reference image and those of the search query.

At block 455, a combined score may be calculated by the control circuitry 220 and/or 228. The combined score, in some embodiments, may be an average of the visual matching score and the aesthetic score. In other embodiments, the combined score may be a mean, standard deviation, or based on another predetermined formula. In some embodiments, the reference image may be ranked in an order based on its combined score.

At block 460, the control circuitry 220 and/or 228 may determine whether the combined score is above a predetermined combined score threshold. If a determination is made that the combined score is not above a predetermined combined score threshold, then the process may end at block 440. In other embodiments, if a determination is made that the combined score is not above a predetermined combined score threshold, then, the server may query other servers to obtain additional reference images by include the search attributes and recompute their aesthetic and visual matching score until a reference image with a combined score above the threshold is obtained. The server may include a counter to attempt finding reference images with a higher combined score until a counter limit is reached and then end the process at block 440.

If a determination is made that the combined score is above a predetermined combined score threshold, then, the process may move to block 465, where the reference images may be displayed on the user device in a variety of formats. Some examples of formats of display of the reference images are depicted at block 106 of FIG. 1 and in FIGS. 10-12.

At block 470, the control circuitry 220 and/or 228 may provide image enhancement options that allow the captured image to be enhanced based on a reference image displayed on the user device being selected. In some embodiments, the user of the electronic device may incorporate image-composing techniques used in the selected reference image or images to enhance the captured image. The user may either perform the incorporation manually or invoke a step-by-step guide that will assist the user in applying the image-composing techniques used in the selected reference image to enhance the captured image. For example, the user may desire to incorporate the techniques used in the reference image to have better lighting in the captured image. The user may also desire to incorporate the framing techniques used in the reference image. They may also desire to focus on their subject in the captured image and have a similar effect of showcasing their subject as the reference image does. As such, the user may invoke a step-by-step guide that provides guidance to the user to obtain effects in the captured image that are similar to those in the selected reference image.

In some embodiments, the step-by-step guidance may be visual, auditory, or both. For example, a visual guidance may visually direct the user to deploy same techniques as in the reference image and audio guidance may so the same in an auditory fashion.

In other embodiments, the user of the electronic device may select multiple reference images from the reference images displayed at block 465. The user may select one or more features or attributes from each of the selected reference images, of the multiple reference images, to have the same effect in their captured image as in the attributes selected in the multiple reference images. For example, from a first reference image, the user may want to have a similar contrast in their captured image, and from a second reference image the user may want to have a similar framing of the key subject. As such, both selected attributes from the multiple reference images may be incorporated into the captured image. As mentioned above, the user may either perform the incorporation manually or invoke the step-by-step guide to assist the user in applying the techniques used in the selected multiple reference images to enhance the captured image. Some examples of enhancement categories that the user may select from are depicted in FIG. 9, which are the same as the categories used for scoring the reference image's aesthetic quality.

In some embodiments, the user of the electronic device may select one or more reference images displayed at block 465 to automatically apply same techniques used in the selected reference images to the captured image such that the captured image may be enhanced to have similar effects as in the selected reference images. In other embodiments, the control circuitry 220 and/or 228 may invoke an artificial intelligence (AI) engine to execute an AI algorithm for automatically selecting one or more reference images and automatically enhancing the captured images based on the automatically selected reference images. The AI engine may also select different images for foreground and background and combine the best separate foreground and background images.

In some embodiments, the electronic device used for capturing the image may be automatically configured by the control circuitry 220 and/or 228. In some embodiments, once the user selects one or more reference images, or if the reference images are automatically selected by the control circuitry 220 and/or 228, the control circuitry 220 and/or 228 may configure the user device settings such that the configured settings allow the user to capture the image to have effects similar to those of the reference images. For example, the control circuitry 220 and/or 228 may configure the brightness setting, turn on the flash, shift the camera to portrait mode, or perform one or more other setting configurations that are provided by the electronic device. Configuring such settings may allow the user to obtain similar effects of the selected reference image, such as similar brightness, in the captured image.

FIG. 5 is a block diagram of trigger mechanisms that may initiate the captured image enhancement process, in accordance with some embodiments of the disclosure.

In some embodiments, as depicted at block 505, process 100 of FIG. 1 and process 400 of FIG. 4 are activated when a camera activation 505 is detected by the control circuitry 220 and/or 228. In this embodiment, a user may select a camera application downloaded on their smart phone to activate the camera. The user may also select any shortcuts that are configured on their phone, such as pressing of the power button twice on a Google Pixel™ phone or swiping up from a lock screen on a Samsung Galaxy™ phone. A camera may also be activated via voice activation or by selecting certain camera icons on a mobile device. When the camera is activated, the control circuitry may receive a notification and start the process of enhancing an image in the viewfinder of the camera display. If a blank screen or a dark screen is detected, which may occur due to accidental activation of the camera, such as in the pocket of a user, then the process 100 or 400 may not be initiated.

In some embodiments, as depicted at block 510, process 100 of FIG. 1 and process 400 of FIG. 4 are activated when an image is in the viewfinder 510 of a display associated with a camera of a Wi-Fi capable device. For example, when using a mobile device, tablet, smart watch or any other device that is a smart device that is capable of connecting to the internet and other devices via Wi-Fi, then such notification of an image in the viewfinder is detected by the control circuitry 220 and/or 228 and it may start the process of enhancing an image in the viewfinder of the camera display. If a blank screen or a dark screen is detected in the viewfinder, which may occur due to accidental activation of the camera, such as in the pocket of a user, then the process 100 or 400 may not be initiated.

In some embodiments, as depicted at block 515, process 100 of FIG. 1 and process 400 of FIG. 4 are activated when an image is captured by the user. In this embodiment, the process may start only if the image is captured and not if the image is still in the viewfinder and not captured yet. Capturing the image may require the user to select a button on their electronic device to snap the picture. The user may also configure the device such that a timer may be used to capture the picture. When the image is captured, the control circuitry 220 and/or 228 may get a notification and start the process of enhancing the captured image.

In some embodiments, as depicted at block 520, process 100 of FIG. 1 and process 400 of FIG. 4 are activated when an image is received via a text or e-mail or other means, such as airdrop, by a user device. In this embodiment, since the user is not the one who is capturing the image, the reference images are used to enhance the image by providing post-capturing-editing of the image, as opposed to in other embodiments, when users still have the option of retaking the picture based on reference images and suggestions provided. Such editing may include cropping, adjusting lighting, contrast, rotating the image, such as fixing orientation, types of background styles, etc. The process 100 of FIG. 1 and process 400 of FIG. 4 may be used when the control circuitry 220 and/or 228 receives notification of the image being received and determines that the image can be enhanced using reference images.

In some embodiments, as depicted at block 525, process 100 of FIG. 1 and process 400 of FIG. 4 are activated when the user initiates photo library editing mode. In this embodiment, the user may have taken several pictures over a certain period of time. The user may select one or more of the pictures already taken that are stored in the user's photo library associated with their electronic device or select the entire photo library. The user may indicate to the control circuitry, such as by pressing a button, such as an "inspire Me" button, for the control circuitry 220 and/or 228 to initiate the process 100 or 400 and enhance the images already stored in the photo library by providing post-capturing edits based on the reference images. For example, such post capturing edits may include suggestions on how to crop the captured image.

Figure 14:
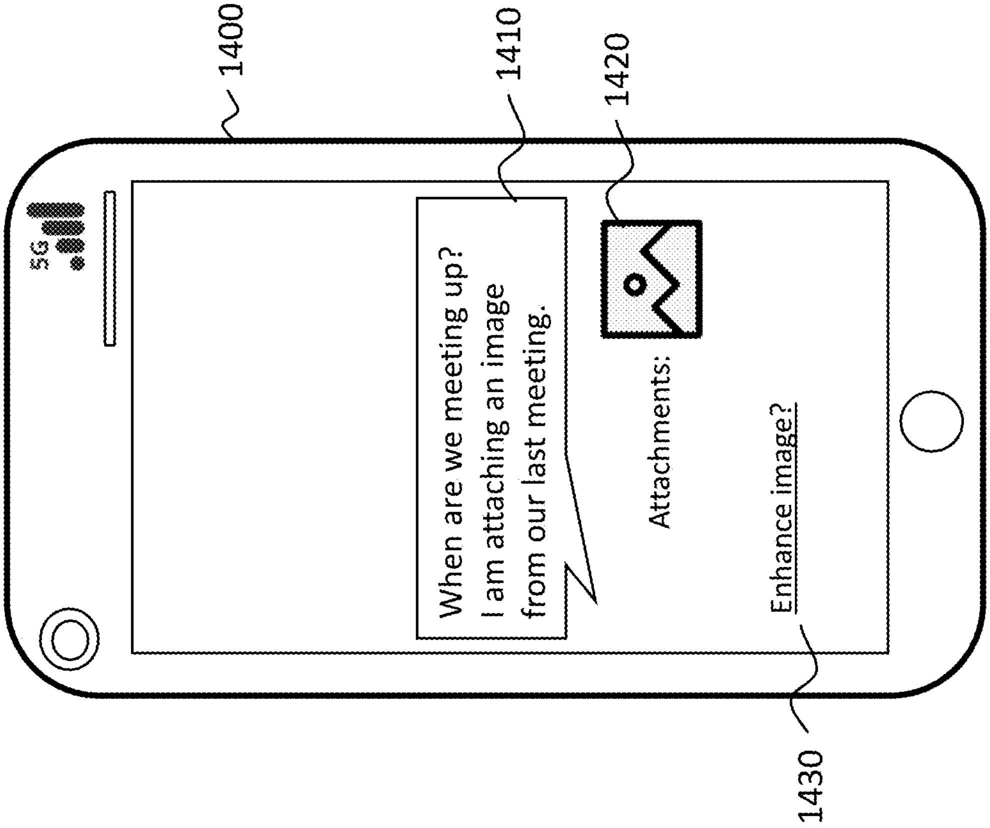
FIG. 14 depicts an outgoing message on a smart phone that includes an image as an attachment, in accordance with some embodiments of the disclosure.

In some embodiments, as depicted at block 530, process 100 of FIG. 1 and process 400 of FIG. 4 are activated when an image is being attached to an outgoing message, such as the message in FIG. 14. In this embodiment, the process may start when a user is composing a message, such as message 1410 in FIG. 14, and has attached an image 1420 to the message. The control circuitry 220 and/or 228 may get a notification of the attached image and provide an option to the user, such as option 1430 in FIG. 14. If the user selects the option, then reference images are used to enhance the image by providing post-capturing editing of the image. Such editing may include cropping, adjusting lighting, contrast, types of background styles, etc. The process 100 of FIG. 1 and process 400 of FIG. 4 may be used when the control circuitry 220 and/or 228 receives notification of the image being received and determines that the image can be enhanced using reference images.

If a person or animal (or some objects of interest) is detected in any of the blocks 505-530, such as the image in the viewfinder 510 depicts a person, the image captured at 515 depicts a person, or the image received at 520 depicts a person, then inclusion of such person(s) or animal initiates process 600 of FIG. 6.

FIG. 6 is a block diagram of an example of a process for segmenting portions of a captured image when a person is detected in its foreground, in accordance with some embodiments of the disclosure. Although the description of FIG. 6 relates to detection of a person in the foreground and then segmenting the detected person, the processes of the present disclosure are not so limited and may apply to any foreground subject or living thing, such an animal, trees, etc., or any type of object of interest. The process 600 may be implemented, in whole or in part, by systems or devices such as those shown in FIGS. 2-3. One or more actions of the process 100 may be incorporated into or combined with one or more actions of any other process or embodiments described herein. The process 600 may be saved to a memory or storage (e.g., any one of those depicted in FIGS. 2-3) as one or more instructions or routines that may be executed by a corresponding device or system to implement the process 600.

In some embodiments, the control circuitry 220 and/or 228 may receive an input image, such as the image received at block 101 of FIG. 1 or block 405 of FIG. 4. The control circuitry 220 and/or 228 may analyze the received input image by applying a semantic segmentation model at block 610. In this embodiment, the control circuitry 220 and/or 228 may identify a person (or persons) as a semantic category. In some embodiments, the semantic segmentation model at block 610 may be applied when a determination is made that the input image contains a person(s) or an animal(s).

At block 620, a determination is made by the control circuitry 220 and/or 228 as to whether the segmented image contains an object of interest in the foreground of the image. Some examples of objects of interest may include person(s), animal(s), or any living entity, and any non-living objects, such a car, lamp, sculpture etc. The control circuitry 220 and/or 228, in some embodiments, analyses the size of the object of interest (e.g., person(s), animal(s), non-living objects, etc.) as compared to the rest of the objects and white space in the image to determine whether an object segment is large enough to be considered as being a focal point in the foreground. A predetermined size ratio or percentage may be used to determine if the object of interest (e.g., person(s), animal(s), non-living objects, etc.) is in the foreground. For example, if the person occupies 20% or more of the image, then the control circuitry 220 and/or 228 may determine that the person is in the foreground or a key component of the image.

If a determination is made at block 620 that an object of interest (such as a person, animal, or any other type of non-living object), is in the foreground, then the object of interest will be embedded separately from the rest of the image. Likewise, separate embedding of the object of interest may also be performed if the object of interest is a key component of the image, even if it is not in the foreground. The separately embedded object of interest may then be represented as a vector and a deep learning model may be applied.

In some embodiments, as depicted at block 630, control circuitry 220 and/or 228 may cut out the semantic foreground part, which contains the object of interest, from the background, and the remaining background may be in-painted, as depicted at block 650, with the deep learning model. The background may also be embedded separately. In other words, the image is split into an image with the object of interest (e.g., person(s), animal(s), non-living objects, etc.), as if they are on another layer on top of the background, and the background as a separate image. A benefit of such splitting of the image includes applying the deep learning model to background and foreground (i.e., to the object of interest) separately to obtain their attributes. The attributes obtained are then more focused on each portion of the image, and errors that may be caused due to a crowded image having both people and background are reduced.

At block 650, once the foreground is cut out, which contains the object of interest (e.g., person(s), animal(s), non-living objects, etc.), the control circuitry 220 and/or 228 may compute object embedding which involves extracting object-specific attributes, such as attributes displayed in FIG. 7. The model may be trained and fine-tuned to extract relevant attributes of the object that may be used as part of a search query for finding reference images that include similar object-related attributes. The object embedding details are then sent to a server to find reference images that include similar object-related attributes.

Likewise at block 660, the background embedding, which involves extracting scenery or background-related attributes, is performed. The background embedding details are then sent to the server to find reference images that include similar background-related attributes.

FIG. 7 is a block diagram of examples of categories of attributes that can be obtained when an object of interest (e.g., person(s), animal(s), non-living objects, etc.) is depicted in a captured image, in accordance with some embodiments of the disclosure. These person- or individual-specific attributes include gender 705, age 710, demographic 715, ethnicity 720, height 725, skin completion 730, and any other feature of the person, such as their hairstyle 735. The person- or individual-specific attributes may also include location of the image taken, e.g., that the people were present in San Francisco when the image was captured. Attributes may also include time and date when an image was captured.

In some embodiments, the control circuitry 220 and/or 228 may invoke a facial recognition and/or an artificial intelligence algorithm. The facial recognition algorithm may be used to determine specific facial features of a person depicted in the image. The facial recognition algorithm may also be used to associate a person depicted in the image with stored images of people, such as celebrities, friends, family members. The artificial intelligence algorithm may be used to determine if certain attributes of a person depicted in the image match attributes of people in reference images.

In some embodiments, the control circuitry 220 and/or 228 may also analyze the attributes 705-735 and categorize the attributes such that the attributes may be used as part of search query to obtain reference images that include similar attributes. For example, if a person is tall, then height 725 may be selected as an attribute. The height attribute may be used in a search query to find reference images that also include tall persons. Such reference images may be used as a guide to provide examples of poses that can be used by a tall person when their image is being captured.

Figure 8:
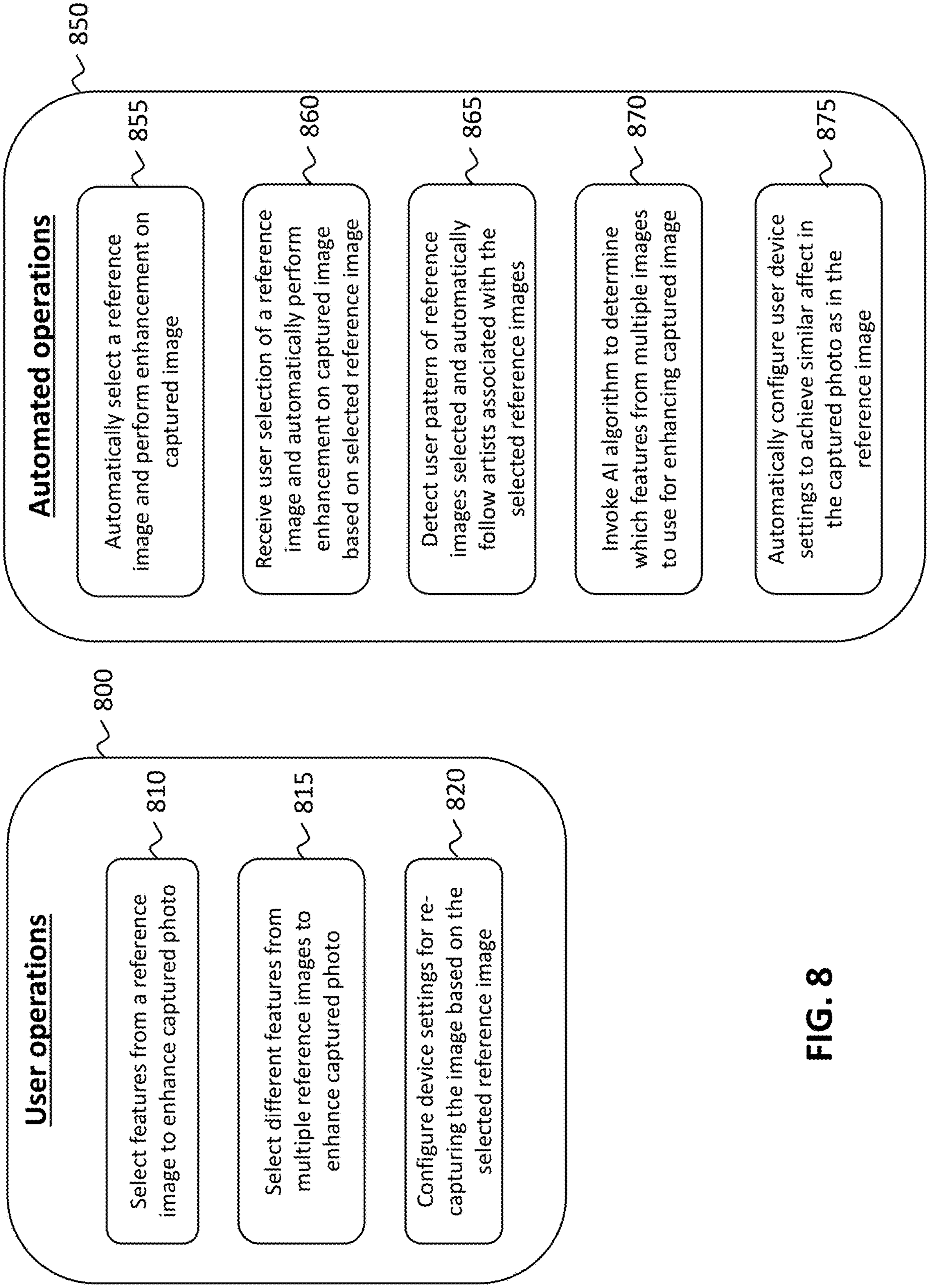
FIG. 8 is a block diagram of example of user initiated and automated operations that may be performed and are related to enhancing a captured image, in accordance with some embodiments of the disclosure.

FIG. 8 is a block diagram of examples of user-initiated and automated operations that may be performed and are related to enhancing a captured image, in accordance with some embodiments of the disclosure.

User operations 800, in some embodiments, includes the user selecting features from a reference image to enhance the captured photo 810. In this embodiment, the user of the electronic device may select one or more reference images displayed on a user interface of the electronic device, such as the reference images displayed in FIGS. 11 and 12. The user may incorporate image-composing techniques used in the selected one or more reference images to enhance the captured image. The user may either perform the incorporation manually or invoke a step-by-step guide that will assist the user in applying the image-composing techniques used in the selected reference image to enhance the captured image. For example, the user may desire to incorporate the techniques used in the reference image to have better framing or lighting in the captured image. If selecting multiple reference images, the user may indicate which attributes of each reference image the user would like to use for enhancing the captured image. For example, the user may like the framing of a first reference image, the pose of a second reference image, and the brightness of a third reference image.

If the user invokes the step-by-step guide, the control circuitry may visually or audibly guide the user on how to obtain effects in their captured image that are similar to those in the selected reference image. When the step-by-step guidance is visual, it may depict arrows or other visual indicators guiding the user on how to compose the image. If the guidance is auditory guidance, then the guidance may provide audio that directs and explains to the user how to operate their device or what steps to take to capture the image to obtain the same effect as in the selected reference image. In some embodiments, the guidance may be both visual and auditory.

User operations 800, in some embodiments, include the user selecting different features from multiple reference images to enhance the captured photo 815. In this embodiment, the user of the electronic device may select multiple reference images from the reference images displayed on a user interface of the electronic device, such as the reference images displayed in FIGS. 11 and 12 or in block 106 of FIG. 1. The user may select the entire reference images or may select one or more features or attributes from each of the selected reference images. Based on the selections, the user may either perform the operations to have the same effect in their captured image as in the attributes selected in the multiple reference images or invoke the step-by-step guide as described above.

User operations 800, in some embodiments, include the user configuring the setting of the user device to recapture the image based on the selected reference image 820. In this embodiment, the user of the electronic device may select a reference image displayed on a user interface of the electronic device, such as the reference images displayed in FIGS. 11 and 12. Once they have selected, the user may be guided to configure their electronic device that is to be used to capture the image. The guiding may include providing visual or auditory information on which settings of the electronic device to configure in order to obtain the same effect in the image about to be captured as in the selected reference image.

Automated operations 850, in some embodiments, include the control circuitry 220 and/or 228 configured to automatically select one or more reference images and automatically enhance the captured images based on the automatically selected reference images 855. To do so, the control circuitry 220 and/or 228 may invoke an AI engine to execute an AI algorithm for determining which reference images to select and which features of a reference image to be used to enhance the captured image. The AI algorithm may detect deficiencies in the captured image and enhance those attributes that would be presented better if enhanced, as depicted at block 870. For example, the AI algorithm results may indicate that enhancing lighting of the captured image in a similar manner as the reference image would make the captured image look better. As such, based on the results, the control circuitry 220 and/or 228 may enhance the lighting of the captured image.

Similar to 855, at block 860, once a user selects a reference image, the control circuitry 220 and/or 228 may automatically enhance the captured images based on the selected reference image. An AI algorithm may detect deficiencies in the captured image and enhance those attributes that would be presented better if enhanced, based on the selected reference image.

As depicted at block 865, the control circuitry 220 and/or 228 may detect a pattern of reference images selected by the user and, based on the pattern, automatically select one or more reference images and automatically enhance the captured images based on the automatically selected reference images.

Automated operations 850, in some embodiments, include, as depicted at block 875, the control circuitry 220 and/or 228 configured to automatically configure the device based on reference images selected, either by the user or automatically selected based on suggestions from the AI algorithm. In this embodiment, the control circuitry may configure the electronic device settings such as turning on a flash, increasing brightness, adjusting a contrast ratio, zooming in on the subject, or any other electronic device configurations that can be automatically made such that the image that is about to be captured has a similar effect as selected reference image.

FIG. 9 is a block diagram of reference image aesthetic scoring categories, in accordance with some embodiments of the disclosure. A plurality of aesthetic scoring categories may be evaluated by the control circuitry 220 and/or 228 in computing an aesthetic score for the reference images.

In some embodiments, a large dataset of professional photos is obtained by a server. There are a few companies that have already built a such dataset for commercial use, for example, at Shutterstock.com™, Adobe™, Getty Images™, etc. In other embodiments, servers that are to be used may be selected, such as based on the servers being associated with friends, family, or colleagues of the user, or individuals that are recognized as professional photographers. The user or the control circuitry 220 and/or 228 may also maintain a list of photographers or individuals that the user likes to follow.

Since reference images are used as a guide to enhance the captured image, understanding the quality of the reference image is important. As such, for reference images at any of the servers, a deep learning model may be used to calculate the aesthetic scores and store the scores on the server. These aesthetic scores may be used as reflective of the quality of the image. For example, the higher the aesthetic score of a reference image, the higher its professional quality. Some categories used for calculating the aesthetic score include calculating the aesthetic score based on determining whether some of the traditional photography principles, as indicate in FIG. 9, were followed. If a determination is made that a reference image was captured by following one or more of the categories 905-960 of well-known photography principles, then the reference image would attain a higher aesthetic score than a reference image that was not.

Figure 10:
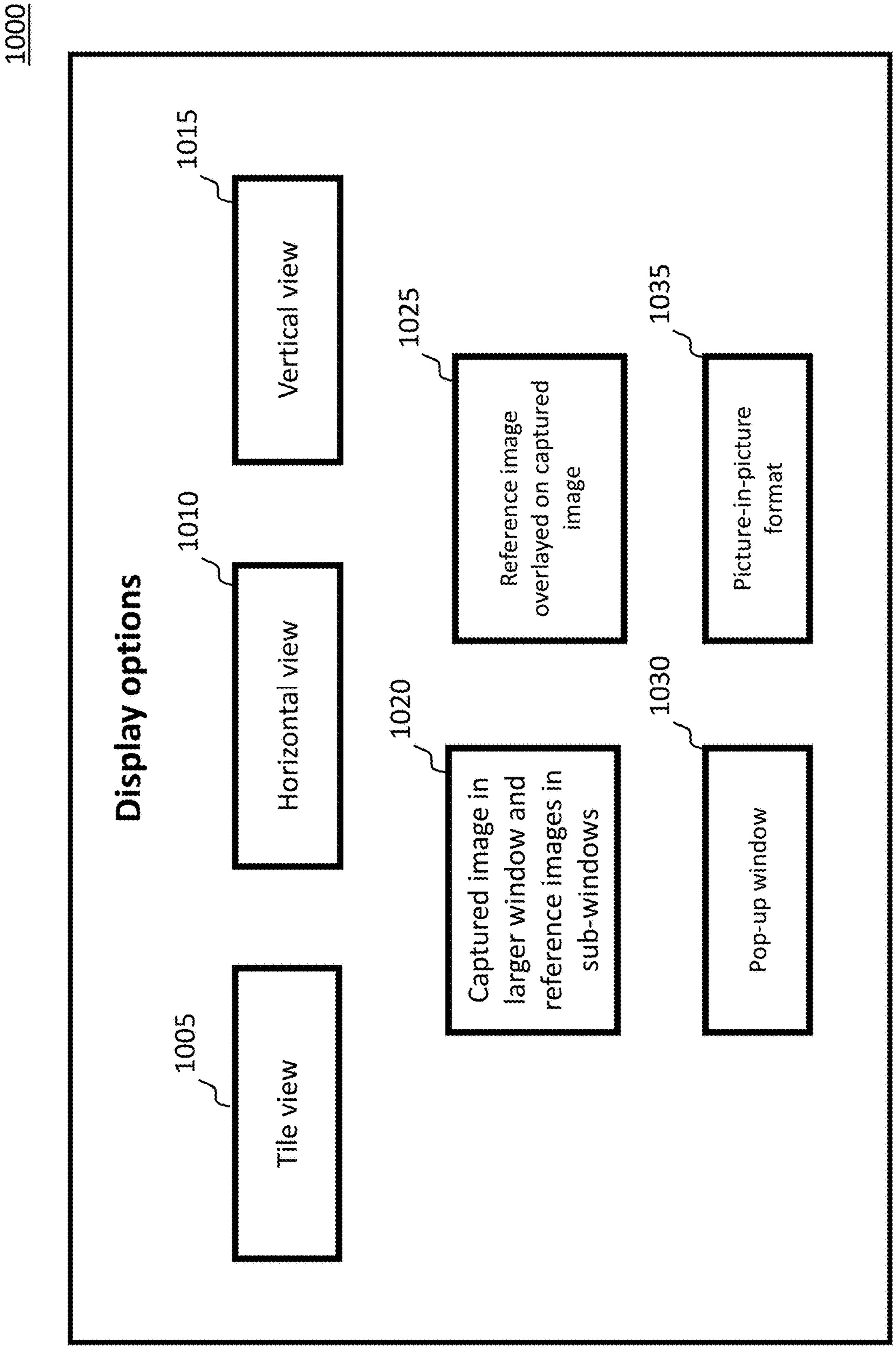
FIG. 10 is a block diagram of reference image display options, in accordance with some embodiments of the disclosure.
Figure 11:
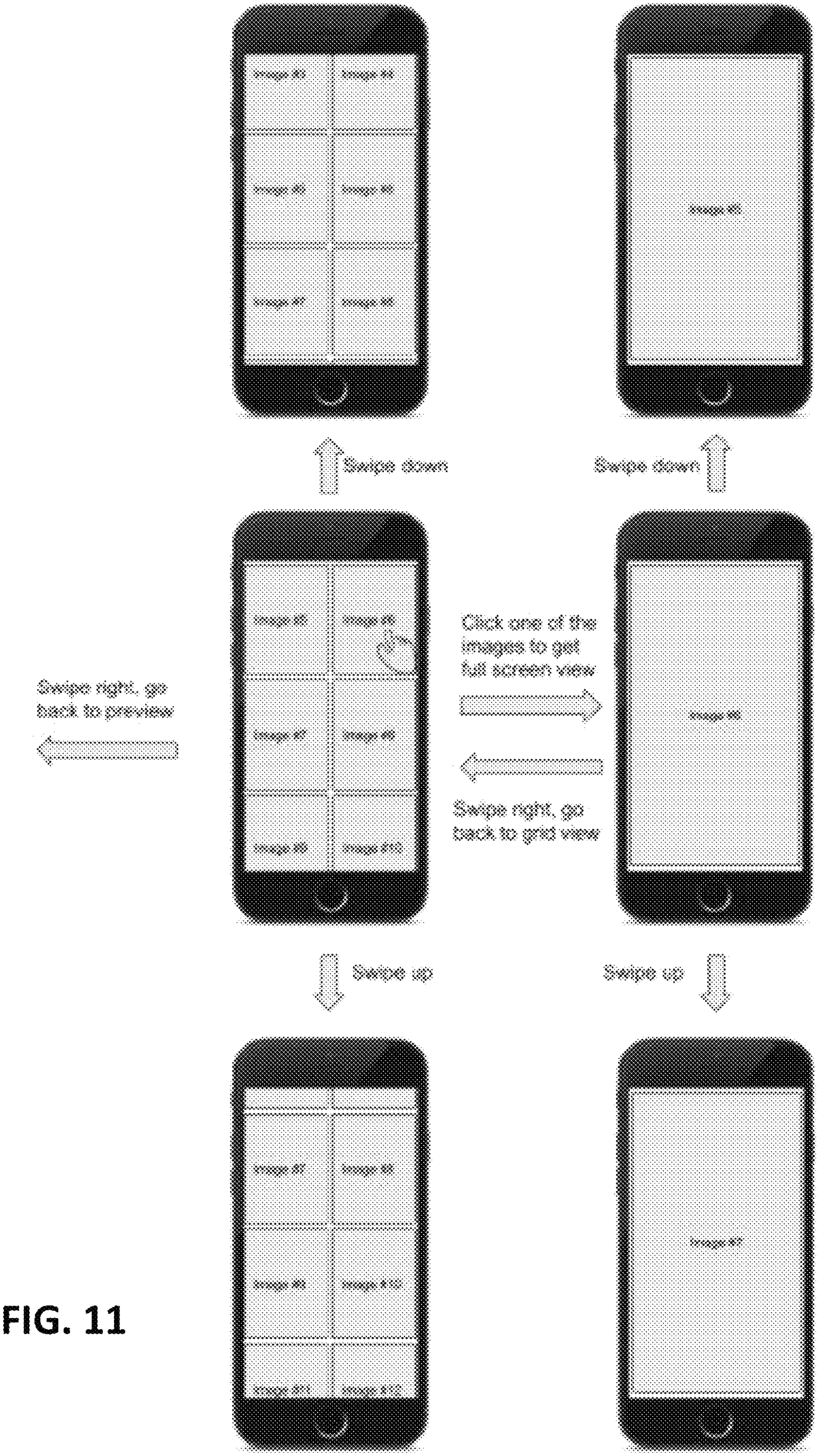
FIG. 11 is an example of a reference image display option where the reference images can be scrolled and selected, in accordance with some embodiments of the disclosure.
Figure 12:
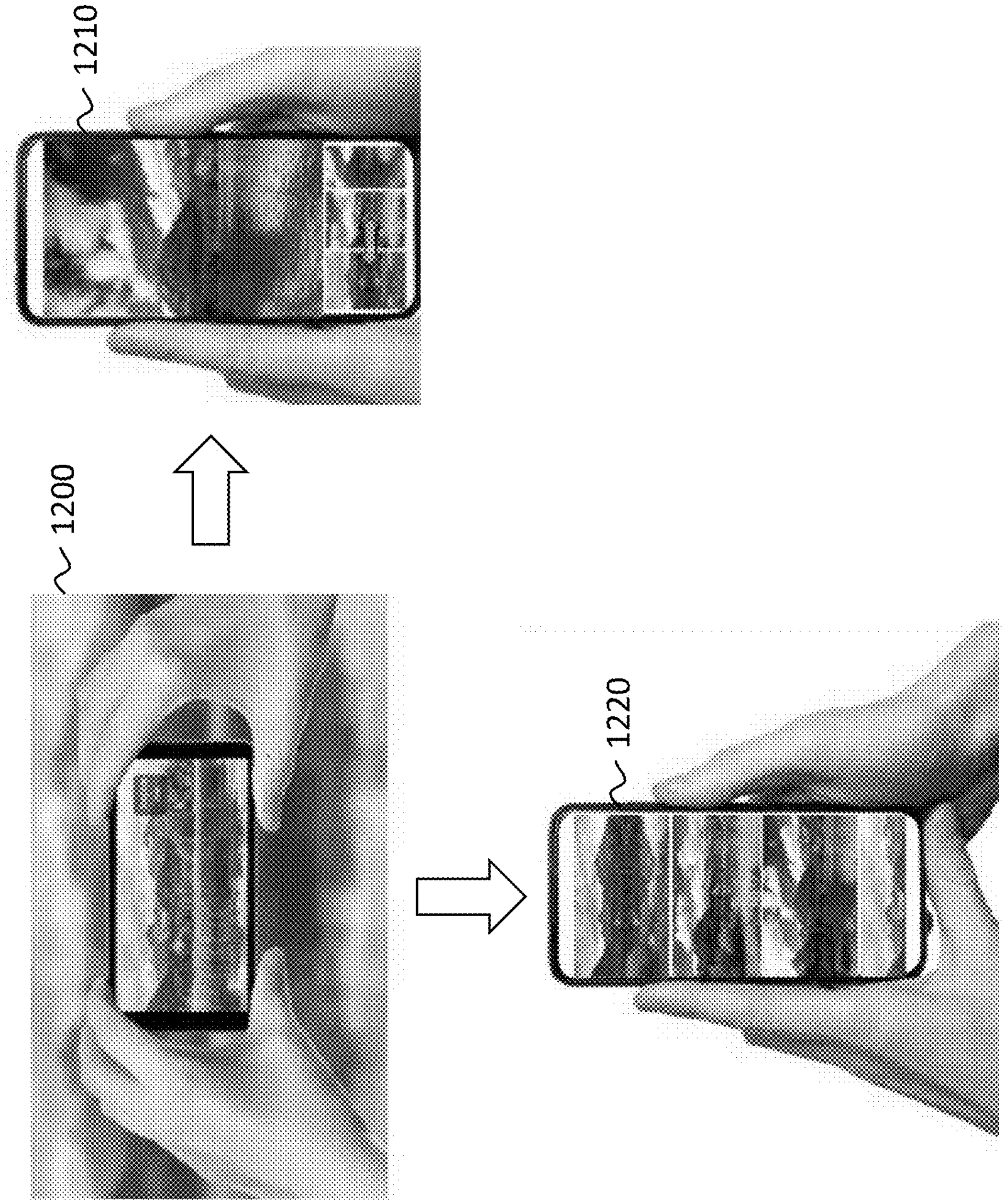
FIG. 12 is another example of a reference image display option where the reference images can be scrolled and selected, in accordance with some embodiments of the disclosure.

FIG. 10 is a block diagram of reference image display options, in accordance with some embodiments of the disclosure. Once a reference image has been identified for displaying on the user interface of the user device, it may be displayed in a variety of formats 1005-1035. In some embodiments, once the reference image has been identified, a plurality of actions may be performed to configure the user interface of the electronic device that will be used to capture the image. These actions may include identifying the format of the reference image, such as horizontal, vertical, portrait mode, landscape mode, etc. The user interface of the electronic device may then be configured to match the attributes of the reference image, such as the user interface of the electronic device may indicate the user to tilt the camera to capture a landscape image. The user interface may also be automatically configured to capture a portrait, such as by adjusting the camera lens automatically to focus on the subject of the image and blur the background. In some embodiments, the user interface actions may be performed sequentially by providing instructions to the user of the electronic device to perform the steps for capturing the image. FIGS. 11 and 12 provide some additional examples of types of formats and user interface actions that may be utilized.

To display the reference images, the user electronic device downloads the reference images sent to it by the server. In the downloading stage, the user device uses a cache to fetch a batch of reference images for display, for instance, the batch size can be set as N=16. When the user has swiped the reference images to a certain portion of N, for example, N/2, the user device starts to download another batch of reference images for potential display.

FIG. 13 is an example of applying a model to a vector representation of an image for image enhancements, in accordance with some embodiments of the disclosure. In some embodiments, block 1300 may be used to generate a vector representation for a large dataset of professional or other reference photos, and blocks 1350, or portions thereof, may be used to generate a vector representation for an image that is to be captured. In this example, block 1350 performs further processing using the vector representations to determine one or more reference images from the large dataset of professional photos that match the attributes of the image to be captured.

With reference to block 1300, in some embodiments a large dataset of professional photos may be collected at the server side, referred to as image dataset 1310 in FIG. 13. This large dataset of professional photos may be collected through a variety of techniques. These techniques may include the server crawling through various websites, databases, and other depositories where access is provided to obtain the professional photos. The professional photos may also be provided by various professional photographers, and the server may store them in a database. The professional photos may also be obtained from third parties that store stock images, such as Shutterfly™.

Vector representations 1330 of the professional photos in the image dataset 1310 may be generated by applying a deep learning model 1320 to the image dataset 1310, as depicted in block 1300. A vector representation generated for a particular image in the image dataset 1310 may be for the overall image, or it may include a different vector representation for the foreground and the background of the image. The vector representation may also be more specific, such as based on the amount of space an object occupies within an image. Having vector representations with such granularity, i.e., a detailed vector representation for foreground, background, portions of an image, percentage occupied by an object in the image, etc., may be helpful in performing detailed searches using such granularity. The vector representation generated for each image in the image dataset 1310 may be in the form of a vector matrix 1330. These vector representations for the image dataset 1310 may be precalculated before a search is conducted at block 1350.

In some embodiments, the images in the image dataset 1310 may include some descriptive attributes in their metadata, such as a comment or caption about an object in the image (e.g., a comment stating "great shot of Golden Gate Bridge"). In such embodiments, while computing the vector representation of the image, a weight or ranking may also be assigned to such images that include such accolades and recognitions. When a search is conducted, images that are ranked based on such comments may be presented in a higher order, ranker higher, or suggested more than other reference images.

In some embodiments, as depicted at 1350, a vector representation 1365 of an image to be captured (e.g., an image shown in a viewfinder of a camera, or an image already captured), also referred to as query image 1355, may be generated. The process may include applying a deep learning model 1360 to the query image 1355 to generate the vector matrix 1365.

The deep learning model 1360 applied to generate the vector matrix 1365 may be the same deep learning model 1320 applied to the image dataset 1310. In other embodiments, the deep learning model 1360 may be a different deep learning model than the deep learning model 1320. Generally, the deep learning model is used to analyze the images and obtain specific attributes of objects, scenes, people, etc., that are depicted in the images. If the image is segmented into foreground and background, then the related vectors for the foreground or background image may be generated.

At block 1370, a vector index may be created to search for the best match between the query image 1355 and the images from the image dataset 1310. The process may include inputting the calculated vector representations for the image dataset 1310 and the vector representation(s) for the query image 1355 to generate a combined vector index. The vector index may be used for searching using the vector representations for the query image 1355 to match vectors with precalculated vector representations for the image dataset 1310. Based on the matching of vectors, related vector representation(s) 1375 may be generated and the best reference image(s) 1380 from the image dataset 1310 may be identified.

The process of blocks 1300 and 1350 may be applied to query images as a whole image or query images that may be segmented into foreground and background to obtain the best images from the image dataset 1310. For example, if the query image includes a person (or an object of interest) in the foreground, then the query image may be segmented into a foreground containing the person (object of interest) and a background without the person (object of interest). As such, the control circuitry may segment the background from the foreground, as described in relation to blocks 610-630 of FIG. 6 and generate an embedding vector 1365 for the background and another embedding vector 1365 for the foreground. The control circuitry may then concatenate the background embedding vector together with the foreground person embedding vector. The concatenation, in some embodiments, may take relevant portions of the vector and combine them such that they make logical sense. For example, in a portrait of a person with a scenic background, the concatenation may include relevant portions of the foreground and the background in a combined vector. This combined vector may then be used as an inquiry vector and inputted into to generate the vector index 1370 as described earlier.

In some embodiments, various rankings may be given to reference images that are found to be related to a query image based on the vector embeddings. The rankings of reference images may be ordered from high to low based on their similarities with the combined vector, for instance. To determine a ranking, the control circuitry may determine similarities between a vector of the reference image and the combined vector of the query image. A reference image with a higher percentage of match with the combined vector may be given a higher score than a reference image with a lower percentage of match.

The top vector search results are then combined with the aesthetic scores of each reference image to provide a weighted ranking. For instance, the top 100 images from the vector search are used. Each image used is then represented with a vector-based metric M, and an aesthetic score A. The final score S for the image can be represented as:

$$S = A - w * M,$$

where w is a weight that is applied to balance the importance of visual similarity and aesthetic quality. In some embodiments, a reference image may be associated with a higher weighted ranking if it contains the objects of interest from the image to be captured. For example, an image to be captured may include a sailboat sailing underneath the Golden Gate Bridge (that is viewable via a viewfinder of a smart phone). In some embodiments a vector representation that identifies the sailboat and the Golden Gate Bridge as objects of interest may be generated. The vector representation may then be used to identify related reference images, and the resulting reference images may be ranked based on one or more factors. The ranking may also be based on a combined score as depicted in block 105 of FIG. 1.

One factor used in ranking the reference image may be if a vector representation of the reference image matches a vector representation of the image to be captured. The higher the similarity of match between the vectors, the higher the ranking may be associated with reference image. For example, a first reference image and a second reference image may both include a sailboat. The first reference image may include a different type/style of sailboat and the sailboat may occupy a much smaller portion of the first reference image than the sailboat in the image to be captured. The first reference image may also include the Golden Gate Bridge. The second reference image may include a sailboat that is of the same type/style and the sailboat may occupy the same (or almost the same) portion of the second reference image as the sailboat in the image to be captured. The second reference image may not include the Golden Gate Bridge. Since the first reference image includes more attributes that match the image to be captured (i.e., the sailboat and the Golden Gate Bridge, although the type/style of sailboat in the first reference image is different than the sailboat in the image to be captured) than the second reference image, a higher rank may be placed on the first reference image than the second reference image based on the number of attributes matched. In other embodiments, another factor used for ranking may be the size of an attribute. In this embodiment, the matching of size or an attribute may be ranked higher than just the number of attributes that match. In this embodiment, since the second reference image includes the sailboat that occupies the same portion of the image as the image to be captured, it may receive a higher ranking than the first reference image. Yet another factor used in ranking may be the similarity of the features of the object, such as brand, style, shape etc. Which attributes are to be ranked higher than other attributes, which qualities of the attributes are to be ranked higher than others, (e.g., qualities such as size, brightness, style, etc.) may be predetermined or may be determine based on recommendations from an AI engine.

Ranking (or weighted ranking) may also consider the percentage of an image that is occupied by the attributes in the image to be captured and whether the reference image has a similar percentage as well. For example, a second reference image that also depicts a sailboat and the Golden Gate Bridge may be found based on the vector search. In the second reference image the percentage of the sailboat and Golden Gate Bridge that occupies the second reference image may be closer to the percentages in the image to be captured. As such a higher degree of similarity may result in their vector representations, and a higher weighted score may be associated with the second reference image than the first reference image since the percentages of the image occupied by objects of interest in the second reference image are closer to the percentages of the image occupied in the image to be taken than that of the first reference image.

Once the final score S for the image is determined, using this combined final score S, the top 100 images can be re-ranked and displayed to the user.

For the first inquiry request from the user for reference images, the server will return the first N reference images based on the ranking results, and will each time return another N images upon subsequent requests.

In some embodiments, the vector representation of an existing image may be changed by the control circuitry. For example, an image may be taken by another user and obtained by the user of the smart phone. The current user may either edit the obtained image or use it as a reference to enhance another image taken by the user. In such instances, to prevent direct copying or violation of any copyrights, the control circuitry may change the vector representations of the obtained image in such a way that it is no longer a direct copy.

In some embodiments, vector representation may be generated for the foreground and the background of the image. The vector representations may be used to perform vector searches for finding reference images that have a similar vector representation.

In some embodiments, generating the vector representations may include classifying the image, foreground or background, into a plurality of classes. An image that displays a house having a yard and a playground with a background scenery of trees and mountains may be classified based on the percentage each object (or living thing) takes up in the image. For example, the image of the house may have a vector representation of 37% house, 18% playground, 12% mountains, 9% trees, and 24% yard. Accordingly, a vector representation of the image may be defined as [0.37, 0.18, 0.12, 0.09, and 0.24] to represent the house and background image.

Once such a vector representation of the house and background image has been generated, in one embodiment, the control circuitry may use the vector representation to search for reference images that include similar percentages of related objects. For example, a reference image that also includes similar objects are found in the vector representation, including similar proportionality, or proportionality within a predetermined threshold may be used. In another embodiment, each vector from the vector representation may be used to find a related reference image. For a reference image that may be used may include mountains in a background that has a vector representation of 12% or +/−a predetermined threshold but does not include the other objects in the image, may be used. Accordingly, each vector may be used separately or in combination with other vectors to search for reference images. The control circuitry may also weight some vectors more than others and use a weighted combination to search for reference images. For example, a vector that represents a house in an image may be weighted more than a vector that represents mountains in a background because the key focus of the image may be the house, such as for a real estate presentation or when a house is being photographed for placing it on sale. As such, the context in which the image is being captured may also be considered in placing weights on objects within the image.

In some embodiments, there may be multiple objects of interest in the foreground and the background of an image. Accordingly, more than one vector representation may be generated to represent such multiple objects of interest or multiple areas of foreground and background. For example, the control circuitry may generate multiple background and foreground vectors if there are distinct objects of interest, or portions in the foreground and background. The control circuitry, based on vector searches performed using the different vectors generated, may find similarities based on comparing the different vectors from the image to be captured with vectors of different reference image categories and may generate combined visual matching scores based on the similarities found.

In some embodiment, the control circuit, in order to find better matching reference images, may provide separate images that better match a background or foreground as inputs to a Generative AI model to generate enhanced matching images. For example, the control circuitry in the example above may provide a separate image of the house, a separate image of the playground, and a separate image of the mountains into the Generative AI model to generate an enhanced matching image. The Generative AI may also select different images for foreground and background and combine the best separate foreground and background images.

In some embodiments, a vector representation of an image may include a number of complexities. For example, an image which is cluttered, has too many objects, or has multiple foreground objects of interest, such as above a predetermined threshold, may be represented by a vector that is more complex than an image which has lesser objects. This may be because the denser and more cluttered image may have a vector that represents several objects in the image. Since some of the objects in a denser and more cluttered image may not be relevant, having a vector representation that represents all such less-relevant objects may not be useful if used in a search. As such, the control circuitry, such as via use of an artificial intelligence engine, may determine what is relevant in the image and reduce the number or complexity of the vector representations to limit it to representing more relevant objects in the image. The control circuit may do so by selecting attributes from the image to be captured to reduce the set of reference images to be searched, and then using vector representations of other components of the client device image(s) to find closest matches. In addition to, or separately from, determining what is and isn't relevant to the image, the control circuitry may also distinguish between visual and non-visual (or less-visual) attributes to limit the vector representation complexity and use the generated visual vector embeddings to determine visual matching scores between the image and the reference images. For example, if an object is partially visible in the image to be captured, or behind another object, is one of many similar objects (such as a book among numerus books in bookshelf that is visible in the image to be captured), then such an object may be considered irrelevant and a vector representation of such an object may not be generated.

FIG. 14 depicts an outgoing message on a smart phone that includes an image as an attachment, in accordance with some embodiments of the disclosure.

In some embodiments, as depicted in FIG. 14, an outgoing message 1410 may be composed by a user of the electronic device. The message 1410 may include an attached image 1420. The control circuitry 220 and/or 228 may get a notification of the attached image 1420 and provide an option 1430 to the user to enhance the image prior to sending the message. If the user selects the option, then reference images are used to enhance the attached image by providing post-capturing editing of the image. Such editing may include cropping, adjusting lighting, contrast, types of background styles, etc. Once the editing of the image is completed, the attached image 1420 may be automatically replaced by the control circuitry by the enhanced version of the attached image 1420.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of enhancing an image captured by a user device, the method comprising:
- detecting an input to initiate an image capture process for capturing a first image via a camera of the user device;
- determining one or more attributes of a preview of the first image;
- identifying one or more reference images that are characterized by the one or more attributes of the preview;
- controlling the user device to display the one or more reference images that are characterized by the one or more attributes of the preview;
- receiving a selection of a first reference image, from the displayed one or more reference images; and
- enhancing the capture of the first image based on the selected first reference image, wherein enhancing the capture further comprises:
- determining one or more device parameters of the user device;
- configuring the one or more device parameters based on one or more attributes of the first reference image; and
- controlling the user device to capture the first image with the configured one or more device parameters.

2. The method of claim 1, wherein identifying one or more reference images that are characterized by the one or more attributes of the preview further comprises:
- identifying a plurality of potential reference images;
- calculating a combined score for each one of the identified plurality of potential reference images; and
- identifying the one or more reference images, from the plurality of potential reference images, for displaying on the user device, based on their combined score.

3. The method of claim 2, wherein each of the one or more reference images selected for displaying on the user device has a combined score that is above a predetermined combined score threshold.

4. The method of claim 2, wherein the combined score is a combination of an aesthetic score, which is associated with a measure of aesthetic quality and a visual matching score, which is associated with a measure of similarity between the one or more attributes of the preview and one or more attributes of a respective reference image.

5. The method of claim 1, further comprising:
- determining that the first image depicts one or more individuals in a foreground; and
- in response to the determination that the first image depicts one or more individuals in the foreground, determining a percentage of the first image occupied by the one or more individuals.

6. The method of claim 5, further comprising:
- determining that the percentage of the first image occupied by the one or more individuals exceeds a predetermined percentage threshold;
- removing a portion of the first image that is occupied by the one or more individuals in response to determining that the percentage of the first image occupied by the one or more individuals exceeds the predetermined percentage threshold; and
- in-painting a background of the image, from which the portion of the first image that is occupied by the individuals is removed.

7. The method of claim 6, further comprising, applying a separate deep learning model to the background and the foreground of the first image, wherein the foreground includes only the removed portion of the first image that is occupied by the one or more individuals.

8. The method of claim 1, further comprising, in response to receiving the selection of the first reference image, automatically configuring the user device to a same configuration as used for capturing the first reference image and recapturing the first image based on the automatic configuration of the user device.

9. The method of claim 1, further comprising:
- applying a deep learning model to the preview to generate a vector representation of the preview; and
- using the vector representation to obtain matching reference images.

10. The method of claim 9, further comprising:
- calculating a vector representation of the one or more attributes of the preview;
- using the calculated vector representation and one or more device parameters of the user device to identify the one or more reference images that are characterized by the one or more attributes of the preview.

11. A system for enhancing an image captured by a user device, the system comprising:
- communications circuitry configured to access the user device; and
- control circuitry configured to:
  - detect an input to initiate an image capture process for capturing a first image via a camera of the user device;
  - determine one or more attributes of a preview of the first image;
  - identify one or more reference images that are characterized by the one or more attributes of the preview;
  - control the user device to display the one or more reference images that are characterized by the one or more attributes of the preview;

receive a selection of a first reference image, from the displayed one or more reference images; and enhance the capture of the first image based on the selected first reference image, wherein enhancing the capture further comprises:

determining one or more device parameters of the user device;

configuring the one or more device parameters based on one or more attributes of the first reference image; and controlling the user device to capture the first image with the configured one or more device parameters.

12. The system of claim 11, wherein identifying one or more reference images that are characterized by the one or more attributes of the preview further comprises the control circuitry configured to:

identify a plurality of potential reference images;

calculate a combined score for each one of the identified plurality of potential reference images; and identify the one or more reference images, from the plurality of potential reference images, for displaying on the user device, based on their combined score.

13. The system of claim 12, wherein each of the one or more reference images selected for displaying on the user device has a combined score that is above a predetermined combined score threshold.

14. The system of claim 12, wherein the combined score is a combination of an aesthetic score, which is associated with a measure of aesthetic quality and a visual matching score, which is associated with a measure of similarity between the one or more attributes of the preview and one or more attributes of a respective reference image.

15. The system of claim 11, further comprising the control circuitry configured to:

determine that the first image depicts one or more individuals in a foreground; and in response to the determination that the first image depicts one or more individuals in the foreground, determining a percentage of the first image occupied by the one or more individuals.

16. The system of claim 15, further comprising the control circuitry configured to:

determine that the percentage of the first image occupied by the one or more individuals exceeds a predetermined percentage threshold;

remove a portion of the first image that is occupied by the one or more individuals in response to determining that the percentage of the first image occupied by the one or more individuals exceeds the predetermined percentage threshold; and in-paint a background of the image, from which the portion of the first image that is occupied by the individuals is removed.

17. The system of claim 16, further comprising, the control circuitry configured to apply a separate deep learning model to the background and the foreground of the first image, wherein the foreground includes only the removed portion of the first image that is occupied by the one or more individuals.

18. The system of claim 11, further comprising, in response to receiving the selection of the first reference image, the control circuitry configured to automatically configure the user device to a same configuration as used for capturing the first reference image and recapture the first image based on the automatic configuration of the user device.

19. The system of claim 11, further comprising the control circuitry configured to:

apply a deep learning model to the preview to generate a vector representation of the preview; and using the vector representation to obtain matching reference images.

20. The system of claim 19, further comprising the control circuitry configured to:

calculate a vector representation of the one or more attributes of the preview;

using the calculated vector representation and one or more device parameters of the user device to identify the one or more reference images that are characterized by the one or more attributes of the preview.

* * * * *